(12) United States Patent
Minami

(10) Patent No.: US 9,393,661 B2
(45) Date of Patent: *Jul. 19, 2016

(54) METHOD OF USING DEVICE OF PROCESSING TEMPERED GLASS

(71) Applicant: CERON Technologies Inc., Tokyo (JP)

(72) Inventor: Hironori Minami, Kasuya-gun (JP)

(73) Assignee: CERON Technologies Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/421,596

(22) PCT Filed: Jul. 31, 2013

(86) PCT No.: PCT/JP2013/070758
§ 371 (c)(1),
(2) Date: Feb. 13, 2015

(87) PCT Pub. No.: WO2014/034366
PCT Pub. Date: Mar. 6, 2014

(65) Prior Publication Data
US 2015/0231753 A1 Aug. 20, 2015

(30) Foreign Application Priority Data
Aug. 31, 2012 (WO) .................. PCT/JP12/72137

(51) Int. Cl.
*B24B 1/04* (2006.01)
*C03B 33/10* (2006.01)
(Continued)

(52) U.S. Cl.
CPC . *B24B 1/04* (2013.01); *B24B 7/248* (2013.01); *B24D 7/18* (2013.01); *C03B 33/10* (2013.01)

(58) Field of Classification Search
CPC .......... B24B 1/04; B24B 7/241; B24B 7/242; B24B 7/248; B24B 41/053; B28D 1/14; C03B 33/037; C03B 33/10; C03C 17/00; G05B 19/418; G05B 2219/45009; Y10T 409/303752; Y10T 409/304312

See application file for complete search history.

(56) References Cited

U.S. PATENT DOCUMENTS 6,776,563 B2 * 8/2004 Shamoto ................. B23B 29/12
310/323.16
7,340,985 B2 * 3/2008 Claesson ............... B23B 27/002
173/162.1

(Continued)

FOREIGN PATENT DOCUMENTS

JP 2002-346817 A 12/2002
JP 2004-83378 A 3/2004

(Continued)

OTHER PUBLICATIONS

International Search Report dated Nov. 5, 2013 issued in corresponding application No. PCT/JP2013/070758.

*Primary Examiner* — Timothy V Eley
(74) *Attorney, Agent, or Firm* — Westerman, Hattori, Daniels & Adrian, LLP

(57) ABSTRACT

The processing device has a shaft shape, at least an outer surface of a front end which is a surface of holding diamond grind grains, and a concave portion formed on a central part in a radial direction of a front surface. The chemical tempered glass having a surface reinforced layer is processed by using the processing device which is rotated around its shaft center and vibrated in a direction of extending the shaft center. The vibration of the processing device is feed-back controlled to the chemical tempered glass to approach an amplitude and a frequency of the processing device to a target amplitude and a target frequency, respectively, and setting the target amplitude at a value in a range from 3 µm to 9 µm and the target frequency at a value in a range from 60 kHz to 64 kHz.

2 Claims, 32 Drawing Sheets

(51) Int. Cl.
  *B24D 7/18*   (2006.01)
  *B24B 7/24*   (2006.01)

(56) References Cited

U.S. PATENT DOCUMENTS

| | | | | |
|---|---|---|---|---|
| 2004/0155558 | A1* | 8/2004 | Cuttino | H01L 41/0906 310/317 |
| 2010/0288101 | A1* | 11/2010 | Iwamoto | C03B 33/03 83/883 |
| 2013/0309034 | A1* | 11/2013 | Inakgaki | B23Q 17/0976 409/132 |
| 2014/0093322 | A1* | 4/2014 | Bleicher | B30B 15/304 409/131 |
| 2015/0166392 | A1* | 6/2015 | Minami | B28D 1/14 409/131 |
| 2015/0225284 | A1* | 8/2015 | Minami | B28D 1/14 700/157 |
| 2015/0353412 | A1* | 12/2015 | Minami | B28D 1/14 451/5 |

FOREIGN PATENT DOCUMENTS

| | | |
|---|---|---|
| JP | 2006-18922 A | 1/2006 |
| JP | 2009-184878 A | 8/2009 |
| JP | 2012-31018 A | 2/2012 |

* cited by examiner

| vibration number of processing unit (KHz) | 40 | 42 | 44 | 46 | 48 | 50 | 52 | 54 | 56 | 58 | 59 | 60 |
|---|---|---|---|---|---|---|---|---|---|---|---|---|
| state of processing | × | × | × | × | × | △ | △ | △ | △ | △ | △ | ○ |

| vibration number of processing unit (KHz) | 61 | 62 | 63 | 64 | 65 | 66 | 67 | 68 | 69 | 70 | 72 | 74 |
|---|---|---|---|---|---|---|---|---|---|---|---|---|
| state of processing | ○ | ○ | ○ | ○ | △ | △ | △ | △ | × | × | × | × |

× tempered glasses were broken
△ Chipping 100 to 150 μ m (prcessing may be possible, but quality was worse)
○ Chipping 30 μ m or less (both of prcessing and quality are good)

Fig. 5

| vibration amplitude of processing unit (μ m) | 1 | 2 | 3 | 6 | 7 | 8 | 9 | 10 | 11 | 12 |
|---|---|---|---|---|---|---|---|---|---|---|
| state of processing | × | × | ○ | ○ | ○ | ○ | ○ | △ | × | × |

×    tempered glasses were broken
△    Chipping 100 to 150 μ m (prcessing may be possible, but quality was worse)
○    Chipping 30 μ m or less (both of prcessing and quality are good)

Fig. 6

| response speed (m sec) | 10 | 5 | 1 | 0.5 | 0.4 | 0.3 | 0.2 |
|---|---|---|---|---|---|---|---|
| state of processing | × | × | × | △ | △ | ○ | ○ |

×    tempered glasses were broken
△    Chipping 100 to 150 μ m (prcessing may be possible, but quality was worse)
○    Chipping 30 μ m or less (both of prcessing and quality are good)

magnified photograph of part A (270 times)

primary processing secondary processing polish processing magnified photograph of part B (270 times)

magnified photograph of part C (270 times)

Fig. 19
magnified photograph of part A (270 times)
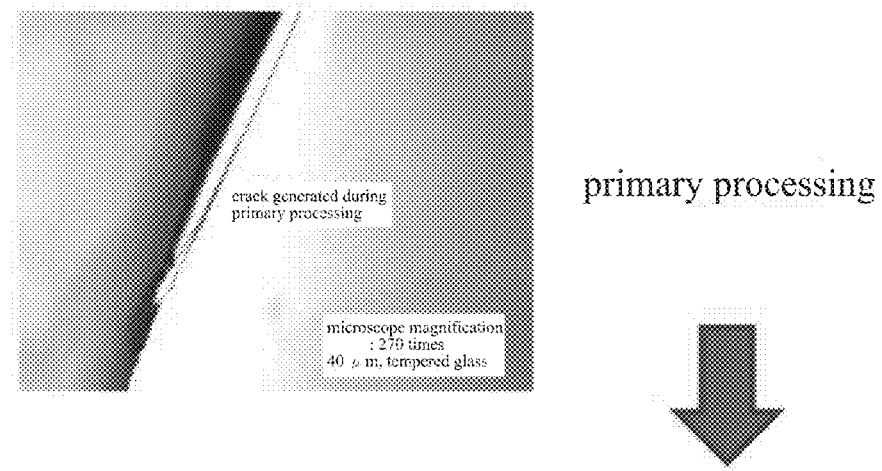
primary processing
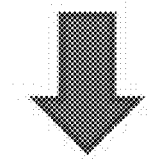
secondary processing
(no processing due to
crack generation)
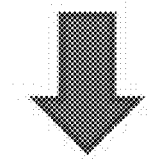
polish processing
(no processing due to
crack generation)

magnified photograph of part D (90 times)

primary processing

METHOD OF USING DEVICE OF PROCESSING TEMPERED GLASS

TECHNICAL FIELD

The present invention relates to a device of processing tempered glass, an apparatus of processing tempered glass and a method of using the device of processing the tempered glass.

BACKGROUND ART

A display device such as a mobile terminal, a tablet, a touch panel and PDA (Personal Digital Assistant) generally employs a tempered glass which is chemically reinforced. The tempered glass configures a glass base material and a surface reinforced layer (chemically reinforced layer) on its top surface. This configuration enables the tempered glass having the thinner thickness while realizing the higher strength against bending stress and impact.

The processing of the tempered glass having the surface reinforced layer of a certain thickness or more and a certain surface compression stress or more (for example, the thickness of the surface reinforced layer is 40 μm or more, and the surface compression stress is 600 MPa or more) is mot easy. Accordingly, a method of processing the tempered glass of Patent Publication 1 describes the tempered glass having the surface reinforced layer of 30 μm or less and the surface compression stress of 600 MPa or less which is processed by employing a known cutting method (such as laser beam machining). Further, Patent Publication 2 proposes a method of processing a tempered glass (the thickness of the surface reinforced layer is 40 μm or more, and the surface compression stress is 600 MPa or more) having a surface reinforced layer a part of which is removed for weakening the processing strength at an expected cutting position. Then, in this method, an expected cutting trench is formed and cut by using a laser.

However, in Patent Publication 1, only the workability of the tempered glass is attached importance and a further thinning and a further strengthening which are currently required are not satisfied by employing the method of Patent publication 1.

The formation of the expected cutting trench on the surface reinforced layer is essential in Patent publication 2 to increase the number of the steps, and further the processing on the tempered glass is restrictive because the expected cutting trench may be formed only in a linear fashion.

Under these situations, the present inventor pays the attention to a method of processing a tempered glass in which a processing device is vibrated under the rotation thereof and which has been recognized hardly applicable thereto. The present inventor has found the conditions for properly processing the tempered glass in the above method.

In an apparatus for processing the tempered glass in which the above processing method is implemented, a processing device is used which is shaft-shaped and includes at least a top end outer surface formed as a surface of holding diamond grind grains. The processing device processes the reinforced glass having the surface reinforced layer under the condition of the vibration in the extending direction along the shaft center together with the rotation around the shaft center. The processing forms a penetration aperture through the reinforced glass.

PRIOR TECHNICAL PUBLICATIONS

Patent Publications

Patent Publication 1: JP-A-2004-83378
Patent Publication 2: JP-A-2012-31018

SUMMARY OF INVENTION

Problems to Be Solved By Invention

In the processing to the above reinforced glass, when the front end surface of the processing device is a flat surface, the temperature rises from the center of the diameter direction, and the diamond grind grains and their holding layer are gradually carbonized from the center of the diameter direction toward the outer periphery of the diameter direction of the front end surface of the processing device so that the diamond grind grains and their holding layer tend to be exfoliated (eliminated). When the diamond grind grains are exfoliated (eliminated) in the processing device, the above processing device must be replaced with a new one so that the processing device cannot necessarily be used for a long period of time.

The preset invention has been made in consideration of the above matters. A first object thereof is to provide a device of processing a tempered glass in which an employable period of time can be increased as much as possible.

A second object thereof is to provide an apparatus of processing a tempered glass which employs the above device of processing the tempered glass.

A third object thereof is to provide a method of using the above device of processing the tempered glass.

Means of Solving Problems

The present invention for achieving the first object has the configuration of a processing device for a tempered glass for processing the chemical tempered glass having a surface reinforced layer, which is shaft-shaped, rotated around its shaft center and vibrated in a direction of extending the shaft center, wherein at least an outer surface of a front end is a surface of holding diamond grind grains, and a concave portion is formed on a central part in a radial direction of a front surface thereof.

The present invention for achieving the second object has the configuration of a processing apparatus for a tempered glass for processing the chemical tempered glass having a surface reinforced layer by using a processing device in a condition of vibrating the shaft-shaped processing device in a direction of a shaft center while rotating the processing device around the shaft center thereof, wherein at least an outer surface of a front end of the processing device is a surface of holding diamond grind grains, and a concave portion is formed on a central part in a radial direction of a front end surface of the processing device.

The present invention for achieving the third object has the configuration of a method of using a processing device of a tempered glass comprising:

preparing the shaft-shaped processing device including a surface of holding diamond grind grains on at least an outer surface of a front end thereof, and a concave portion formed on a central part in a radial direction of a front surface thereof, and processing the chemical tempered glass having a surface reinforced layer by using the processing device which is rotated around its shaft center and vibrated in a direction of extending the shaft center.

Effects of Invention

In accordance with the present invention, in the processing of the chemical tempered glass, the shaft-shaped processing device for the tempered glass is used under the rotation around its shaft center and the vibration in the direction of extending the shaft center. Under this condition, its front end surface (diamond grind grains) collides with the chemical tempered glass based on its vibration for the processing thereof, and because the concave portion is formed on the central part in the radial direction of the front end surface of the processing device, the collision of the central part in the radial direction of the front end surface with the chemical tempered glass based on the vibration can be avoided by the existence of the concave portion so that the concentrated generation of the heat on the central part in the radial direction of the front end surface due to the collision can be prevented. In this manner, the carbonization and the exfoliation (elimination) of the diamond grind grains and their holding surface from the center of the front end surface in the radial direction of the processing device toward the outer side can be suppressed, and a period of using the processing device can be considerably increased.

In accordance with the invention, a connecting aperture of connecting inside and outside of the concave portion is formed through a side portion of the processing device. Accordingly, the cut scrap included in the concave portion by the processing of the tempered glass is positively discharged with the grinding liquid from the hole under the processing toward the outside of the side portion of the processing device by utilizing the centrifugal force, and the discharged cut scrap is effectively discharged to the outside by efficiently utilizing the discharging function (so-called pumping function: the function of providing acceleration to the cut scrap to promote the discharge) toward the outside generated between the shaft-shaped processing device under the ultrasonic vibration and the hole under the processing. Thereby, the damage of the processed surface and the prevention of the processing of the tempered glass by the cut scrap can be suppressed.

In accordance with the invention, the connecting aperture is a pair of slits extending, in a direction of extending the shaft center, from a front end of a circumferential wall of forming the concave portion in the circumferential wall, and the pair of the slits are opposed to each other. Accordingly, the connecting aperture can be easily formed, and the balanced arrangement of the pair of the slits can preferably discharge the cut scrap from the concave portion and process the penetration aperture.

In accordance with the invention, the processing to the chemical tempered glass is formation of a penetration aperture through the chemical tempered glass, and the device is used such that the device moves while it is inscribed to an inner circumference-scheduled line of the penetration aperture during the formation of the penetration aperture (the helical processing is used). Accordingly, when the concave portion is formed on the front end surface of the processing device for the tempered glass, the penetration aperture can be properly formed through the chemical tempered glass regardless of the processing depth (the length of the penetration aperture in the extending direction of the shaft center) of the penetration aperture to be formed while preventing the concentrated generation of the heat on the central part in the radial direction of the processing device.

During the processing, the discharge space (the space between the aperture under the processing and the processing device) for the cut scrap can be secured to which the cut scrap can be appropriately discharged. Accordingly, the processing to the chemical tempered glass can be properly performed without the influence of the cut scrap.

In accordance with the invention, the path for supplying the grinding liquid is formed inside of the device, and the path for supplying the grinding liquid is open to the concave portion. Accordingly, the cut scrap included in the concave portion of the front end surface of the processing device by the processing of the tempered glass is continuously pushed out into the hole under the processing by means of the grinding liquid, and the pushed-out cut scrap is positively discharged with the grinding liquid so that the problem regarding the processing of the chemical tempered glass caused by the remaining cut scrap can be suppressed. Since the path for supplying the grinding liquid is formed in the processing device, the structure for supplying the grinding liquid can be simplified while securing the supply of the grinding liquid.

In accordance with the invention, the vibration is feedback-controlled in which an amplitude and a frequency approach to a target amplitude and a target frequency, respectively, and values of the target amplitude and the target frequency change at respective positions in a direction of thickness of the chemical tempered glass accompanied with the processing of the chemical tempered glass, which are not set to belong to a range of generating quality degradation. Accordingly, while even the tempered glass having the surface reinforcing layer with the higher strength (specifically, 40 μm or more of the surface reinforced layer and 600 Mpa or more of the surface compression stress) can be freely processed without any restriction such as a processing track, the amplitude and the frequency can be basically set not to belong to the range of generating quality degradation during the vibration of the processing device.

As a sample frequency during the above feedback-control, the specified sample frequency of 0.3 msec or less is used. Accordingly, the sample frequency can be re-examined at the significantly rapid timing, and even if the amplitude and the frequency of the processing device become values in the range of generating quality degradation, these can be returned to the target amplitude and the target frequency of the processing device (outside of the range of generating quality degradation) at the above significantly rapid timing. Even if the slight condition change during the processing such as release of a tensile stress in the chemical tempered glass takes place, it can be responded (followed), and the generation of the cracks and the chippings of the chemical tempered glass above the specified value during the processing can be appropriately suppressed. As a result, the chemical tempered glass can be simply and reliably processed.

Accordingly, even the chemical tempered glass of which strength is increased by inclusion of the surface reinforced layer can be simply and reliably processed while securing a degree of processing freedom.

The reason why the specified sample frequency of 0.3 msec or less is used as the sample frequency during the above feedback-control is that, based on the present inventor's finding, the tempered glass cannot follow the stress change in the tempered glass accompanied with the processing over 0.3 msec, and the accuracy of the processing of the chemical tempered glass is decreased with higher probability (the cracks and the chippings above the specified value are generated in the tempered glass).

In accordance with the invention, a processing apparatus for a tempered glass for processing the chemical tempered glass having a surface reinforced layer by using a processing device in a condition of vibrating the shaft-shaped processing device in a direction of a shaft center while rotating the processing device around the shaft center thereof is provided wherein at least an outer surface of a front end of the processing device is a surface of holding diamond grind grains, and a concave portion is formed on a central part in a radial direction of a front surface of the processing device. Accordingly, the above processing apparatus for the tempered glass is configured by utilizing the processing device for the tempered glass so that the processing apparatus for the tempered glass using the processing device for the tempered glass can be provided.

In accordance with the invention, the processing to the chemical tempered glass is formation of a penetration aperture through the chemical tempered glass, and the device is used such that the device moves while it is inscribed to an inner circumference-scheduled line of the penetration aperture during the formation of the penetration aperture (the helical processing is used). Accordingly, when the concave portion is formed on the front end surface of the processing device for the tempered glass, the penetration aperture can be properly formed through the chemical tempered glass regardless of the processing depth (the length of the penetration aperture in the extending direction of the shaft center) of the penetration aperture to be formed while preventing the concentrated generation of the heat on the central part in the radial direction of the processing device.

During the processing, the discharge space for the cut scrap can be secured to which the cut scrap can be appropriately discharged. Accordingly, the processing to the chemical tempered glass can be properly performed without the hindrance of the cut scrap.

In accordance with the invention, the rotating direction of the processing device is set toward the inner circumference-scheduled line of the penetration aperture on the moving side of the processing device (so-called down-cut). Accordingly, even if the inner circumferential surface of the aperture (aperture before the completion of the penetration aperture) under the processing is processed from the side portion of the processing device, the cut scrap generated in the processing can be smoothly discharged to the discharge space behind the moving direction of the processing device, and the generation of the chipping caused by the inclusion of the cut scrap can be suppressed.

In accordance with the invention, a connecting aperture of connecting inside and outside of the concave portion is formed in a side portion of the processing device. Accordingly, the cut scrap included in the concave portion by the processing of the tempered glass is positively discharged from the hole under the processing toward the outside of the side portion of the processing device by utilizing the centrifugal force, and the discharged cut scrap is effectively discharged to the outside by efficiently utilizing the discharging function (so-called pumping function: the function of providing acceleration to the cut scrap for promoting the discharge) toward the outside generated between the shaft-shaped processing device under the ultrasonic vibration and the hole under the processing. Thereby, the damage of the processed surface and the prevention of the processing of the tempered glass by the cut scrap can be suppressed.

In accordance with the invention, the connecting aperture is a pair of slits extending, in a direction of extending the shaft center of the processing device, from a front end of a circumferential wall of forming the concave portion in the circumferential wall, and the pair of the slits are opposed to each other. Accordingly, the connecting aperture can be easily formed, and the balanced arrangement of the pair of the slits can preferably discharge the cut scrap from the concave portion and process the chemical tempered glass.

In accordance with the invention, a liquid pouring apparatus for pouring a grinding liquid to a vicinity of a position of the chemical tempered glass to be processed by the processing device is mounted. Accordingly, not only the chemical tempered glass and the processing device can be cooled but also the cut scrap is positively discharged from the hole under the processing so that the occurrence of the problem about the processing of the tempered glass due to the remaining of the cut scrap can be suppressed.

In accordance with the invention, a path for supplying a grinding liquid is formed inside of the processing device, and the path for supplying the grinding liquid is open to the concave portion. Accordingly, the cut scrap included in the concave portion of the front end surface of the processing device by the processing of the tempered glass is continuously pushed out into the hole under the processing by means of the grinding liquid, and the pushed-out cut scrap is positively discharged with the grinding liquid so that the problem regarding the processing of the chemical tempered glass caused by the remaining cut scrap can be suppressed. Since the path for supplying the grinding liquid is formed in the processing device, the structure for supplying the grinding liquid can be simplified while securing the supply of the grinding liquid.

In accordance with the invention, a vibration mechanism of vibrating the processing device toward the chemical tempered glass, a vibration adjusting means of adjusting the vibration mechanism, and a control means of controlling the vibration mechanism are established such that the vibration of the processing device to the chemical tempered glass is feedback-controlled to approach an amplitude and a frequency of the processing device to a target amplitude and a target frequency, respectively, and values of the target amplitude and the target frequency are set to change at respective positions in a direction of thickness of the chemical tempered glass accompanied with the processing of the chemical tempered glass, which do not belong to a range of generating quality degradation, and the feedback control is carried out at every sample frequency of 0.3 msec or less. Accordingly, even the tempered glass having the surface reinforcing layer with the higher strength (specifically, 40 μm or more of the surface reinforced layer and 600 Mpa or more of the surface compression stress) can be freely processed without any restriction such as a processing track by conducting the ultrasonic vibration processing under the vibration and the rotation of the processing device. Even if the release of the tensile stress in the chemical tempered glass takes place in the processing thereof, the generation of the cracks in the chemical tempered glass can be appropriately suppressed based on the above vibration control. Therefore, the processing apparatus for the tempered glass using the processing device for the tempered glass can be provided.

In accordance with the invention, the processing is conducted by preparing the processing device including a shaft shape, at least an outer surface of a front end which is a surface of holding diamond grind grains, and a concave portion formed on a central part in a radial direction of a front surface thereof, and processing the chemical tempered glass having a surface reinforced layer by using the processing device which is rotated around its shaft center and vibrated in a direction of extending the shaft center. Accordingly, the processing of the chemical tempered glass is conducted by using the processing device. Therefore, the process of using the processing device for the tempered glass can be provided.

In accordance with the invention, the processing to the chemical tempered glass is formation of a penetration aperture through the chemical tempered glass, and the device moves while it is inscribed to an inner circumference-scheduled line of the penetration aperture during the formation of the penetration aperture (so-called helical processing). Accordingly, when the concave portion is formed on the front end surface of the processing device for the tempered glass, the penetration aperture can be properly formed through the chemical tempered glass regardless of the processing depth (the length of the penetration aperture in the extending direction of the shaft center) of the penetration aperture to be formed while preventing the concentrated generation of the heat on the central part in the radial direction of the processing device. During the processing, the discharge space for the cut scrap can be secured to which the cut scrap can be appropriately discharged behind the moving direction of the processing device. Accordingly, the processing to the chemical tempered glass can be properly performed without the influence of the cut scrap.

In accordance with the invention, the rotating direction of the processing device is set toward the inner circumference-scheduled line of the penetration aperture on the moving side of the processing device (so-called down-cut). Accordingly, even if the inner circumferential surface of the aperture under the processing is processed by the shaft section of the processing device, the cut scrap generated in the processing can be smoothly discharged to the discharge space behind the moving direction of the processing device, and the generation of the chipping caused by the inclusion of the cut scrap can be suppressed.

In accordance with the invention, the processing device includes a connecting aperture of connecting inside and outside of the concave portion formed in a side portion. Accordingly, the cut scrap included in the concave portion by the processing of the tempered glass is positively discharged with the grinding liquid from the hole under the processing toward the outside of the side portion of the processing device by utilizing the centrifugal force, and the discharged cut scrap is effectively discharged to the outside by efficiently utilizing the discharging function (so-called pumping function: the function of providing acceleration to the cut scrap to promote the discharge) toward the outside generated between the shaft-shaped processing device under the ultrasonic vibration and the hole under the processing. Thereby, the damage of the processed surface and the prevention of the processing of the tempered glass by the cut scrap can be suppressed.

In accordance with the invention, the processing device includes the connecting aperture which is a pair of slits extending, in a direction of extending the shaft center of the processing device, from a front end of a circumferential wall of forming the concave portion in the circumferential wall, and the pair of the slits are opposed to each other. Accordingly, the connecting aperture can be easily formed, and the balanced arrangement of the pair of the slits can preferably discharge the cut scrap from the concave portion and process the chemical tempered glass.

In accordance with the invention, a grinding liquid is supplied to a vicinity of a position of the chemical tempered glass to be processed by the processing device during the processing by the processing device to the chemical tempered glass. Accordingly, not only the chemical tempered glass and the processing device can be cooled but also the cut scrap is positively discharged from the hole under the processing so that the occurrence of the problem about the processing of the tempered glass due to the remaining of the cut scrap can be suppressed.

In accordance with the invention, a path for supplying a grinding liquid, which is open to the concave portion is formed inside of the processing device, and the grind liquid is supplied to the concave portion from the path for supplying the grinding liquid. Accordingly, the cut scrap included in the concave portion of the front end surface of the processing device by the processing of the tempered glass is continuously pushed out into the hole under the processing by means of the grinding liquid, and the pushed-out cut scrap is positively discharged with the grinding liquid so that the problem regarding the processing of the chemical tempered glass caused by the remaining cut scrap can be suppressed. Since the path for supplying the grinding liquid is formed in the processing device, the structure for supplying the grinding liquid can be simplified while securing the supply of the grinding liquid.

In accordance with the invention, a long hole acting as the penetration aperture is formed while a start hole for the long hole is formed by moving the processing device while inscribing the processing device to an inner circumference-scheduled line of the start hole; and thereafter moving a side surface of a shaft section of the processing device which is utilized as a polishing surface while it is inscribed to an inner circumference-scheduled line of the long hole by using this state as a processing start condition in which the processing device is penetrated through the start hole. Accordingly, the long hole can be properly formed by using the processing device. In this case, since the helical processing to the chemical tempered glass is conducted and the cut scrap is discharged to the discharge space for the cut scrap formed in the chemical tempered glass, an adverse effect of the processing of the chemical tempered glass due to the remaining of the cut scrap can be suppressed.

In accordance with the invention, the rotating direction of the processing device is set toward the respective inner circumference-scheduled lines of the long hole and the start hole on the moving side of the processing device (so-called down-cut). Accordingly, even if the chemical tempered glass is processed by the front end surface and the shaft section of the processing device, the cut scrap generated in the processing can be smoothly discharged to the discharge space behind the moving direction of the processing device, and the generation of the chipping caused by the inclusion of the cut scrap can be suppressed.

In accordance with the invention, wherein the vibration of the processing device to the chemical tempered glass is feedback-controlled to approach an amplitude and a frequency of the processing device to a target amplitude and a target frequency, respectively, and values of the target amplitude and the target frequency are set to change at respective positions in a direction of thickness of the chemical tempered glass accompanied with the processing of the chemical tempered glass, which do not belong to a range of generating quality degradation, and the feedback control is carried out at every sample frequency of 0.3 msec or less, so that the effects and the functions can be obtained.

BRIEF DESCRIPTION OF DRAWINGS

FIG. 5 Table showing the experiment results (the experiment results of Processing Experiment 2) wherein the target vibration amplitudes of the processing device were changed while the conditions were fixed such that the target vibration frequency of the processing device was 63 kHz and the sample cycle (response speed) of the feedback was 0.2 msec.

FIG. 6 Table showing the experiment results (the experiment results of Processing Experiment 3) wherein the sample cycles (response speeds) of the feedback were changed while the conditions were fixed such that the target vibration amplitude of the processing device was 8 μm and the target vibration frequency of the processing device was 63 kHz.

FIG. 19 A magnified photograph showing the part of the protection glass for the portable terminal of Comparative Example which corresponds to the part A of FIG. 13 (magnification: 270 times).

EMBODIMENTS FOR IMPLEMENTING INVENTION

Embodiments of the present invention will be hereinafter described referring to the annexed drawings.

In the description of the present embodiment, the tempered glass which is the subject of the of processing, the apparatus of the ultrasonic vibration processing acting as the apparatus for processing the tempered glass, the method of processing the tempered glass employing the above apparatus of the ultrasonic vibration processing, the comparison between processes qualities, a preferable processing device employed in the apparatus of the ultrasonic vibration processing, and a method of its use will be described in this turn.

(1) Tempered Glass

Figure 1:
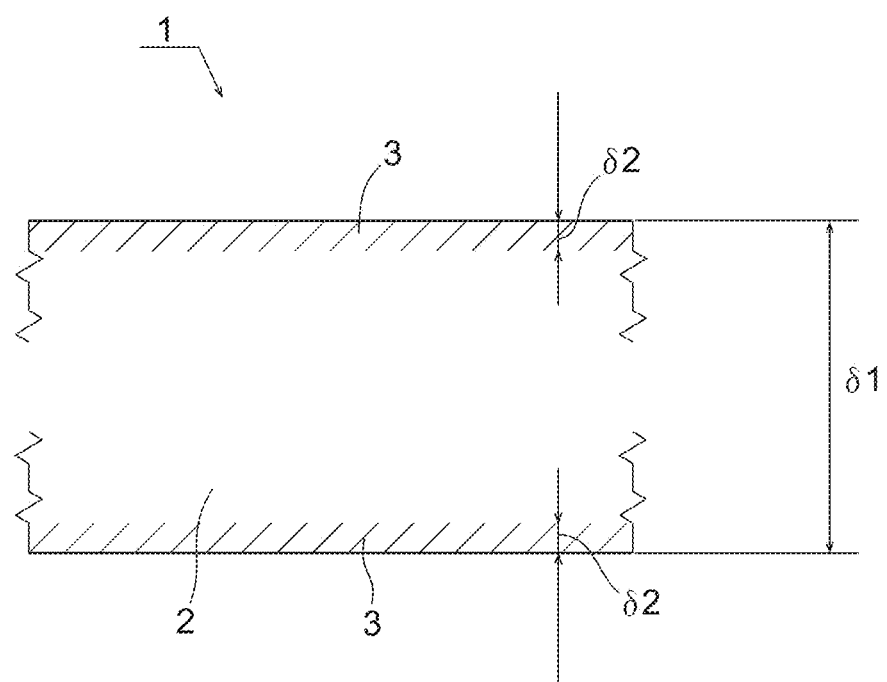
FIG. 1 An explanatory view showing a tempered glass having a surface reinforced layer FIG. 2 An entire configuration of a processing apparatus under ultrasonic vibration in accordance with an embodiment.

As shown in FIG. 1, the tempered glass 1 has the configuration including a glass mother material 2 (for example, alumino-silicate glass) and a surface reinforced layer (chemically reinforced layer) 3 placed on its top surface side (bottom surface side). The surface reinforced layer 3 enables the thinning of the tempered glass 1 and secures the high strength against the impact. The specific tempered glass 1 to be processed has the thickness ($\delta 1$) of the mother material 2 of about 0.7 mm, the thickness ($\delta 2$) of the surface reinforced layer of 3 of 40 µm or more (the surface reinforced layer having the thickness of 70 µm is currently developed which is, of course, a subject of the processing), and a surface compression stress from 600 MPa to 700 MPa. Of course, the ordinary glass in addition to the tempered glass is a subject of the processing by the ultrasonic vibration processing apparatus.

Figure 2:
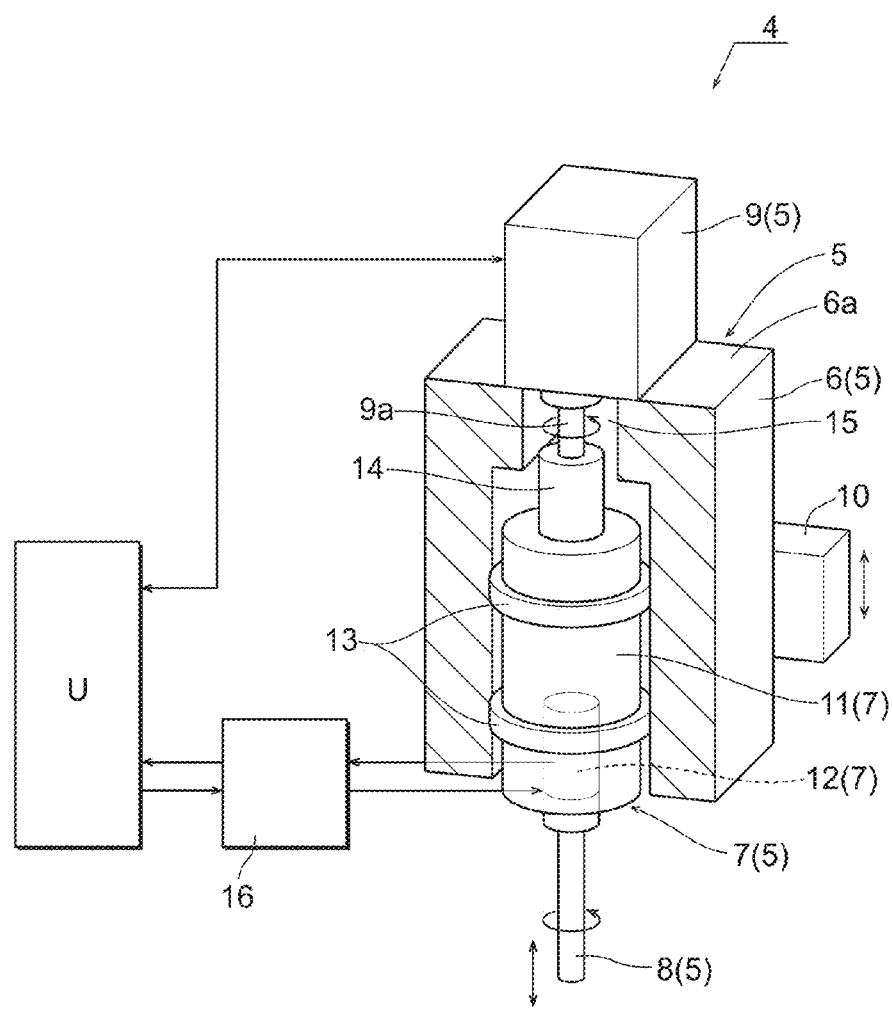

(2) Ultrasonic Vibration Processing Apparatus (i) As shown in FIG. 2, the ultrasonic vibration processing apparatus 4 includes a processing apparatus main body 5.

As shown in FIG. 2, the processing apparatus main body 5 includes a relatively long and cylindrical housing 6 with a closed end, a vibration apparatus (vibration mechanism) 7 mounted in the housing 6, a processing device 8 attached to the vibration apparatus 7, and a motor 9 for rotating and driving the vibration apparatus 7.

(a) The housing is mounted to an elevating apparatus (only part of which (an attaching part to the housing) is shown in FIG. 2) 10. The elevating apparatus 10 has functions of not only raising and lowering the housing 6 along the vertical direction but also adjusting the elevating speed (refer to an arrow). The housing is lowered at a specified setting speed (feed speed) during the processing.

(b) The vibration apparatus 7 includes a columnar body 11, and a columnar unit 12 for generating ultrasonic vibrations. The body 11 is positioned, with its axial center oriented along the vertical direction, on the inner circumferential surface of the housing via bearings 13. The bearings 13 enable the body 11 to rotate around its axial center and disable the body 11 to move along the direction the axial center extends (vertical direction). A circular cylinder 14 for mounting a driving axis 9a of the motor 9 is formed at the top end of the body 11, and a holding aperture (not shown) is formed at the bottom end surface of the body 11. The unit 12 for generating ultrasonic vibrations is fixed to the holding aperture at the bottom surface of the body. As known in the art, the unit 12 is configured with an ultrasonic vibrator, a vibration transmitting section and an amplification section connected in series, and these ultrasonic vibrator, vibration transmitting section and amplification section are disposed in this turn from the inside of the holding aperture of the body 11 toward the open side. The ultrasonic vibrator among these has piezoelectric elements and metal blocks for fastening these with bolts, and electrodes are positioned between the piezoelectric elements and between the piezoelectric element and the metal block. The application of a direct pulse voltage between the electrodes excites the piezoelectric elements to generate the vertical vibrations. The ultrasonic vibrator generates the strong ultrasonic vibrations by means of a resonance phenomenon when the frequency of the direct pulse voltage to be applied is set to be equal to the resonance frequency of the ultrasonic vibrator. The vibration transmitting section has a function of transmitting the vibrations of the ultrasonic vibrator to the amplification section, and the amplification section has a function of amplifying the vibrations transmitted from the vibration transmitting section.

(c) As shown in FIG. 2, the processing device 8 is connected to the amplification section of the unit 12 at the axial center thereof in order to be vibrated by the vibrations of the unit 12. The processing unit 8 processes the tempered glass under the direct contact therewith and is made of a diamond grind stone in the form of axis, and extends downward from the unit 12. The processing device 8 has functions of not only processing the tempered glass and of but also acting as a sensor for detecting the pressure change of the tempered glass.

(d) The motor 9 is mounted to an outer surface (top end surface) of the bottom part 6a of the housing 6. A penetration aperture 15 is formed through the bottom part 6a of the housing 6, which communicates the outside and the inside of the housing, and the driving axis 9a of the motor 9 penetrates the penetration aperture 15 and is engaged and held (fixed) to the circular cylinder 14 of the body 11. Thereby, the driving force of the motor 9 is transmitted through the body 11 and the unit 12 to the processing unit 8 where the processing unit 8 can rotate around the axial center.

Figures 3, 4:
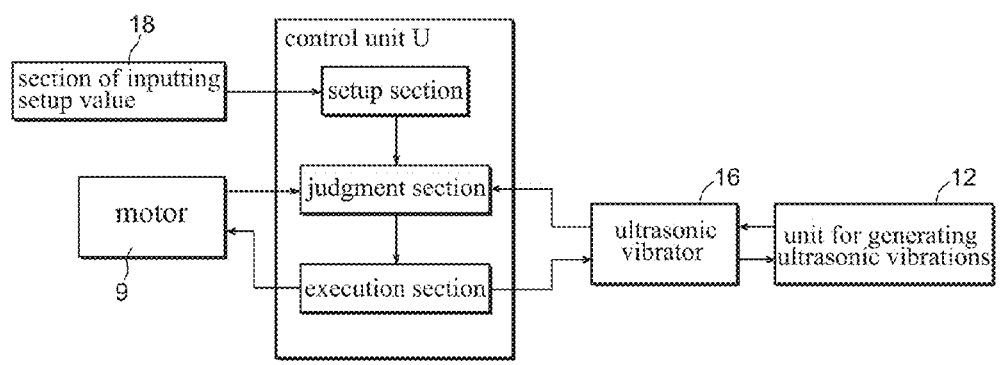
FIG. 3 A block diagram showing a control in the processing apparatus under ultrasonic vibration in accordance with the embodiment.
FIG. 4 Tables showing the experiment results (the experiment results of Processing Experiment 1) wherein the target vibration frequencies of the processing device were changed while the conditions were fixed such that the target vibration amplitude of the processing device was 8 μm and the sample cycle (response speed) of the feedback was 0.2 msec.

(2) As shown in FIG. 2 and FIG. 3, the ultrasonic vibration processing apparatus 4 includes an ultrasonic oscillator (vibration adjusting means) 16 adjusting the vibration amplitude and the vibration frequency of the unit 12.

The ultrasonic oscillator 16 adjusts an input electric signal (specifically, voltage or current), and the adjusted electric signal is then supplied to the unit 12 (ultrasonic vibrator). In this Embodiment, the amplitude and the frequency of an input voltage from a power source are adjusted while the value of current is not changed (for example, a specified value from 1 to 2 A), and the adjusted voltage signal (for example, 300 to 400 V) is supplied to the unit 12 (ultrasonic vibrator). Of course, in this case, a current signal may be supplied to the ultrasonic vibrator under the constant voltage instead of the voltage signal.

(3) As shown in FIG. 2 and FIG. 3, the ultrasonic vibration processing apparatus 4 includes a control unit U which controls the ultrasonic oscillator 16 (unit 12 for generating ultrasonic vibrations).

(a) The voltage signal (amplitude and frequency signals of the voltage) from the ultrasonic oscillator 16, and the rotation number signal of the motor 9 (voltage) are input to the control unit U, and control signals for the ultrasonic oscillator 16 and the motor 9 are output from the control unit U.

(ii) The control unit U includes a setup section (setup means) which setups a target value for a feedback control, a judgment section (judgment means) which judges an operation variable based on the deviation between the target value of the setup section and the control variable, and an execution control section (execution control means) which outputs the control signal for performing the operation variable coming from the judgment section.

The target vibration amplitude and the target vibration frequency with respect to the input voltage to the unit 12 for generating ultrasonic vibrations (ultrasonic vibrator) as the target values for the feedback control are established in the setup section, and these values change along thickness of the tempered glass during the processing of the tempered glass, and do not belong to the range where the value of degrading the quality of the tempered glass is generated (values of generating cracks and the chippings in the tempered glass over the specified degree). This is because the stress change in the tempered glass during the processing such as release of a tensile stress inside of the tempered glass must be considered. The target current is setup with respect to the input current to the motor 9 in view of realizing the effective rotation for the processing.

The target vibration amplitude of the input voltage with respect to the unit 12 for generating ultrasonic vibrations is setup such that the vibration amplitude of the processing device 8 finally falls into a range (which does not fall into a range where a value of degrading the quality of the tempered glass is generated) of 3 μm to 9 μm (preferably 8 μm). The values under 3 μm and over 9 μm are recognized to fall in the range where the value of degrading the quality of the tempered glass is generated. The reasons why the target vibration amplitude is, based on the knowledge the present inventor has obtained, set in the range from 3 μm to 9 μm is that the cracks and the chippings over a specified degree are generated due to the insufficient processing ability (due to the increase of the cutting resistance occurring by the remaining of the cutting scrap) under 3 μm and that the possibility of generating the cracks and the chippings over a specified degree in the tempered glass is increased because the tempered glass cannot follow the stress change generated therein during the processing over 9 μm.

The target vibration frequency of the input voltage with respect to the unit 12 for generating ultrasonic vibrations (ultrasonic vibrator) is setup such that the vibration frequency of the processing device 8 finally falls into a range (which does not fall into a range where the value of degrading the quality of the tempered glass is generated) of 60 kHz to 64 kHz (preferably 63 kHz). The values under 60 kHz and over 64 kHz are recognized to fall in the range where the value of degrading the quality of the tempered glass is generated. The reasons why the target vibration frequency is, based on the knowledge the present inventor has obtained, set in the range from 60 kHz to 64 kHz is that the cracks and the chippings over specified degrees are generated due to the insufficient processing ability under 60 kHz and that the possibility of generating the cracks and the chippings over specified degrees in the tempered glass is increased because the tempered glass cannot follow the stress change generated therein during the processing over 64 kHz.

The target current with respect to the motor 9 is established such that the rotation number of the processing device 8 falls in a specified rotation number from 2000 rpm to 30000 rpm (preferably 5000 rpm). The reasons why the rotation number of the processing device is set in the range from 2000 rpm to 30000 rpm are that the processing effect to the tempered glass is insufficient under 2000 rpm and that the processing effect is reduced by the occurrence of a slip phenomenon (reduction of processing resistance) on the processed surface over 30000 rpm, thereby generating the problem of durability.

In FIG. 3, a numeral 18 denotes a section of inputting a setup value into the setup section.

The judgment section judges, with respect of the vibration amplitude of the processing unit 8, the operation variable based on the deviation between the amplitude of the voltage (return voltage) from the ultrasonic oscillator 16 and the target amplitude of the setup section, and judges, with respect of the vibration number of the processing device 8, the operation variable based on the deviation between the frequency of the voltage (return voltage) from the ultrasonic oscillator 16 and the target frequency of the setup section. With respect to the rotation number of the processing device 8, the operation variable is judged based on the deviation between the current signal from the motor 9 and the target current of the setup section.

(c) The execution control section outputs, as the control signals, the respective operation variables from the judgment section to the ultrasonic oscillator 16 and the motor 9. Thereby, the output voltage (amplitude, frequency) from the ultrasonic oscillator 16 is adjusted so that the processing device 8 is controlled in the feedback fashion to take a specified vertical amplitude and a specified frequency. Also, the rotation number of the motor 9 is controlled in the feedback fashion to keep the rotation number of the processing device at a specified rotation number.

(iii) The control unit U is set to perform the feedback control at the sample cycle (response speed) range of 0.3 msec or less or from 0.3 msec to 0.2 msec (preferably 0.2 msec). The reasons why the sample cycle is set in the range of 0.3 msec to 0.2 msec is that the possibility of generating the cracks and the chipping in the tempered glass over the specified degree increases because the glass cannot follow the slight stress change therein over 0.3 msec, based on the knowledge the present inventor has obtained. The lower limit of 0.2 msec is the lowermost limit currently available, and the feedback control cannot be conducted below the lower limit sample cycle. If a tempered glass having a sample cycle below 0.3 msec will be developed, the use thereof is more preferable.

The speed-up of the analogue/digital conversion function and the arithmetic processing ability of CPU in the control unit U is intended compared to an existing control unit for the speed-up of the sample cycle of the feedback control. Thereby, when the sample cycle is set to be 0.2 msec and the vibration number (frequency) of the processing device 8 is set to be 80 kHz, the number of the vibration impact supplied to the tempered glass before the vibration starts responding to the load change under the optimum conditions can be suppressed to 16 times. When the vibration conditions are made optimum at the sample cycle of 0.2 msec under the feed speed of the processing device 8 of 30 mm/min., the processing proceeds with the feedback control taking place every 0.1 μm so that the slight condition change (stress change) during the processing can be responded (followed).

On the other hand, when the vibration number (frequency) of the processing device 8 is 80 kHz, the vibration impact is supplied to the tempered glass once in every 0.0000125 second (0.0125 ms). When the sample cycle (vibration response speed) is 10 msec under the same vibration number (under the case of existing control unit), 800 times of the vibration impacts are supplied to the tempered glass before the vibration starts responding to the load change under the optimum conditions. When the vibration conditions are optimized at the sample cycle of 10 msec under the feed speed of the processing device 8 of 30 mm/min, the processing proceeds every 5 μm. This 5 μm is relatively larger with respect to the surface reinforced layer of several tens μm, and the condition changes of the tempered glass cannot be followed. As its result, the processing must be performed while the stress is given to the tempered glass, and the cracks are generated on the tempered glass.

(iv) Target values of control

The target values of the above control will be backed up in the Processing Experiments 1 to 3 below which were conducted by the present inventor. The Processing Experiments 1 to 3 were conducted to the tempered glass under the following common experiment conditions, and their evaluations were performed based on the following evaluation standards.

Figure 7:
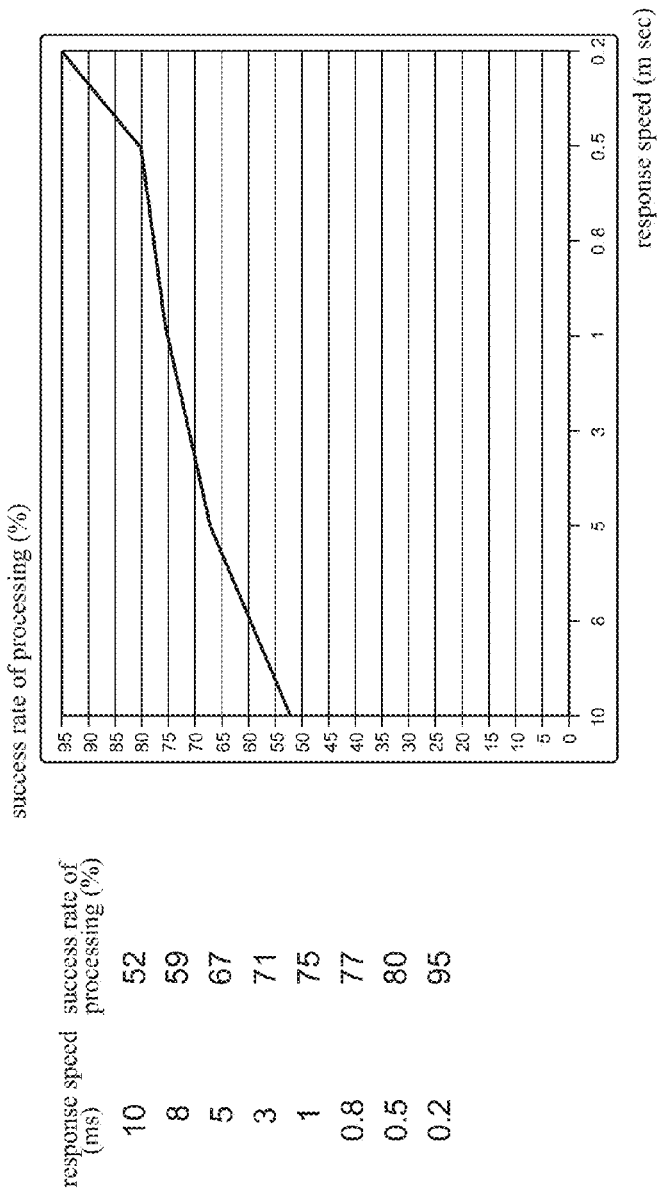
FIG. 7 A graph showing the relation between the sample cycle (response speed) of the feedback and the success rate of the processing.

(a) Common experiment conditions
Tempered glass to be processed
  Material of mother material: alumino-silicate glass
  Thickness of mother material ($\delta 1$): 0.70 mm
  Thickness of surface reinforced layer ($\delta 2$): 40 μm (0.04 mm)
  Compressive residual stress: 600 MPa to 700 MPa
Processing Device 8
  Feed speed for processing: 60 mm/min.
  Number of rotations: 5000 rpm
  Diameter of axial processing device: 1.5 mm
  Grain size of processing device 8: #600
(b) Common evaluation standard
  X: Tempered glass was broken.
  Δ: Chipping 100 to 150 μm (processing might be possible, but quality was worse)
  ◯: Chipping 30 μm or less (both of processing and quality were good)
(c) Processing Experiment 1
  (c-1) An experiment was conducted in which a target number of vibration (target frequency) was changed under the fixed conditions below by adjusting voltages for obtaining excellent number of vibrations of a processing device 8 with respect to one piece of tempered glass.
  Target vibration amplitude of processing device: 8 μm
  Sample cycle (response speed) of feedback: 0.2 msec
  (c-2) The results shown in FIG. 4 were obtained by Processing Experiment 1. In accordance with the results of FIG. 4, it was found out that the target number of vibration of the processing device 8 was preferably from 60 kHz to 64 kHz (especially 64 kHz) (the range where the value of degrading the quality is under 60 kHz and over 64 kHz).
(d) Processing Experiment 2
  (d-1) An experiment was conducted in which a target vibration amplitude of a processing device 8 was changed under the fixed conditions below by adjusting voltages for obtaining excellent target vibration number of the processing device 8 with respect to one piece of tempered glass.
  Target frequency of processing device: 63 kHz
  Sample cycle (response speed) of feedback: 0.2 msec
  (d-2) The results shown in FIG. 5 were obtained by Processing Experiment 2. In accordance with the results of FIG. 5, it was found out that vibration amplitude of the processing device 8 was preferably from 3 μm to 9 μm (especially 8 μm) (the range where the value of degrading the quality is under 3 μm and over 9 μm).
(e) Processing Experiment 3
  (e-1) An experiment was conducted in which a sample cycle (response speed) of feedback was changed under the fixed conditions below because the sample cycle of the feedback of the processing was important for the tempered glass in which a slight condition change occurred during the processing.
  Target vibration amplitude of processing device: 8 μm
  Target vibration frequency of processing device: 63 kHz
  (e-2) The results shown in FIG. 6 were obtained by Processing Experiment 3. In accordance with the results of FIG. 6, it was found out that the sample cycle of the feedback was preferably under 0.3 msec (especially 0.2 msec). The lower limit (0.2 msec) is a limit value currently available
  (e3) FIG. 7 shows the relation between the sample cycles (response speeds) of feedback control and the success rates of the processing. In accordance with FIG. 7, it was found out that the success rate increased with the decrease of the response speed, and the success rate increased with the significant rise especially below 0.5 msec. The evaluation of processing success was the same as the above-mentioned (◯). In FIG. 6, the results with the success rate of 87% or more are evaluated as "◯".

3. Then, an example of the method of processing the tempered glass in accordance with Embodiment will be described together with the control of the above control unit U.

Figure 8:
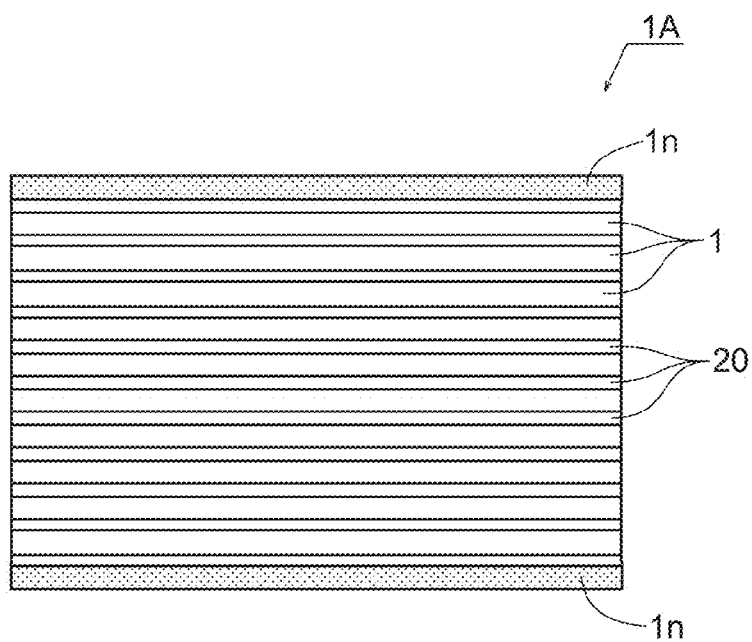
FIG. 8 An explanatory view showing a stacked member of tempered glasses to be processed.

(1) At first, as shown in FIG. 8, the tempered glass 1 (thickness of mother material was 0.7 mm, thickness of surface reinforced layer was 40 μm or more, and surface compression stress was 600 MPa or more) having the surface reinforced layer 3 in the shape of a larger plate is provided. The larger plated-tempered glass is cut out for preparing a plurality of pieces having a certain shape which is used for protection glass of portable terminals and tablets. In the present Embodiment, a stack (a group of stacked glasses) 1A which is prepared by joining a plurality (for example, 12 sheets) of larger plates (tempered glass 1) stacked together by using an adhesive 20 (adhesive layer is 80 μm to 100 μm) is provided for elevating the production efficiency. The adhesive 20 preferably includes a UV cure adhesive which is cured with ultraviolet rays and soluble in warm water because the adhesive is required to be rapidly cured and thereafter to be peeled off from the cut-out respective pieces of the tempered glass. The glass in forming the outermost surface (top surface, bottom surface) of the stack 1A may be inexpensive ordinary glass instead of the tempered glass because chipping likely occurs in the outermost surface of the stack 1A. Another stack 1A prepared by joining 16 sheets of larger plates (tempered glass 1) of which a mother material thickness is 0.5 mm may be also employed.

Figure 9:
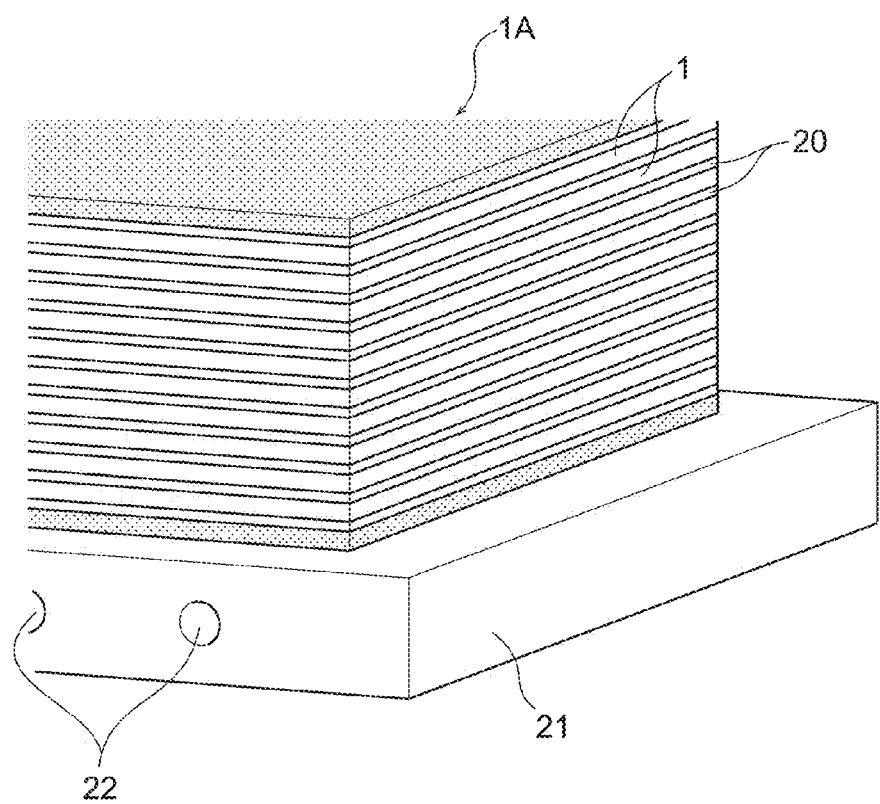
FIG. 9 An explanatory view showing a situation in which the stacked member of the tempered glasses is placed on a holding board.

(2) As shown in FIG. 9, the above stack 1A is then placed on a thick fixing base 21. A plurality of trenches (not shown) are formed on a top surface of the fixing base 21, and a plurality of communication apertures 22 which are communicated to the respective trenches through the inside of the fixing base 21 are open to a side surface of the fixing base 21. A suction device (not shown) is connected to the respective communication apertures 22, and air above the fixing base 21 is sucked through the trenches on the top surface of the fixed base 21 and the communication apertures 22. Thereby, the stack 1A placed on the fixing base 21 is fixed on the fixing base 21 by means of the sucking action.

Figure 10:
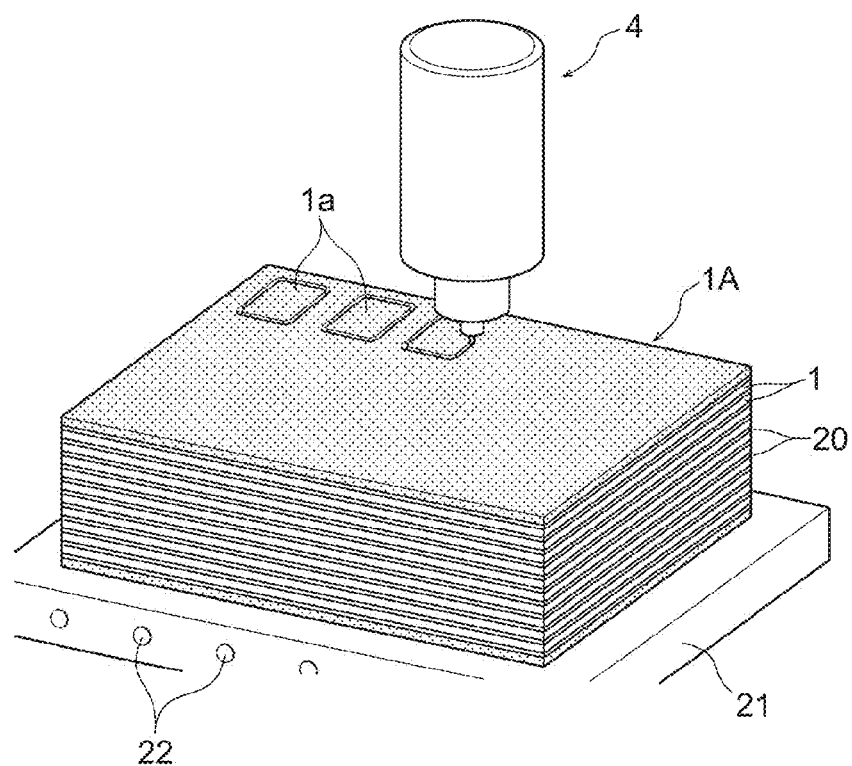
FIG. 10 An explanatory view showing a cut-out processing on the stacked member of the tempered glasses.
Figure 11:
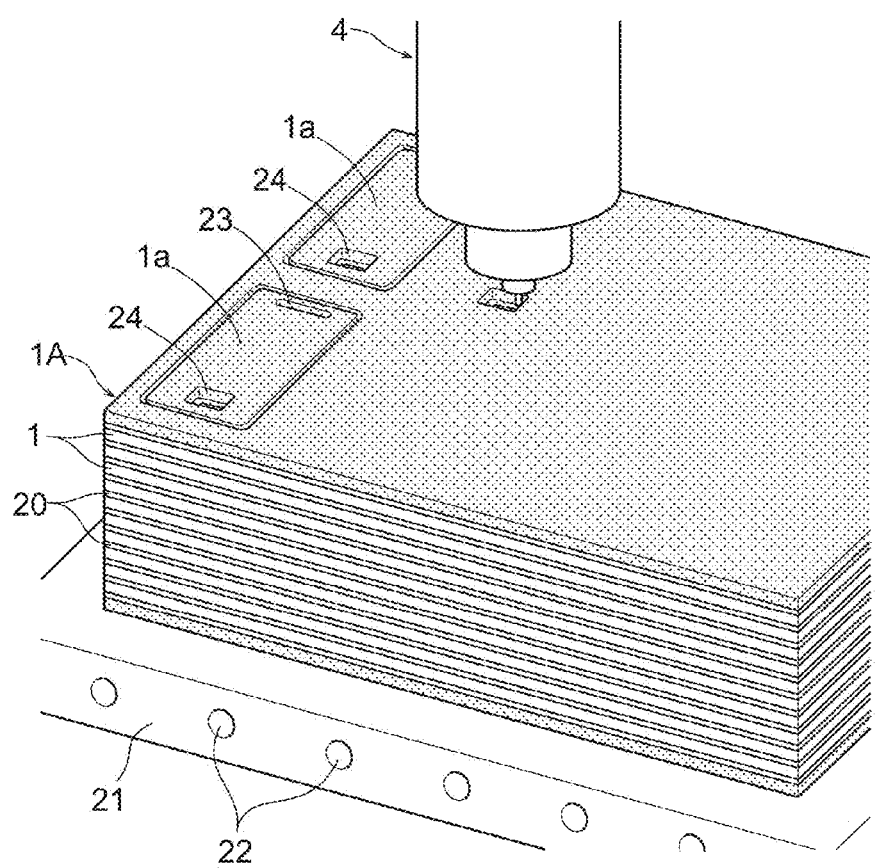
FIG. 11 An explanatory view showing formation of long holes and square holes through a stacked block.
Figure 12:
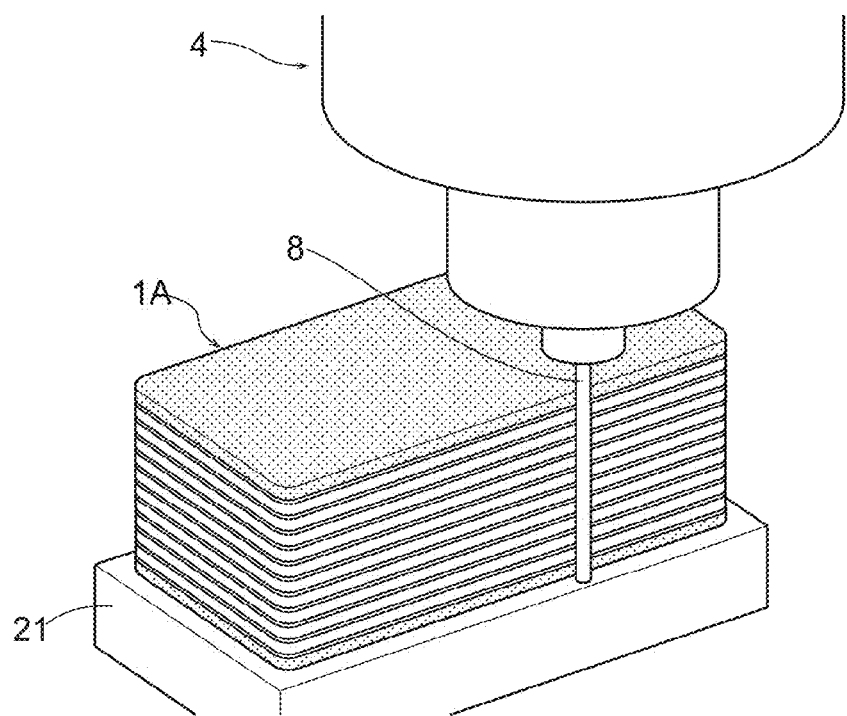
FIG. 12 An explanatory view showing grind processing to the outer periphery of the stacked block.

(3) As shown in FIG. 10, grind processing is performed, by employing the above-mentioned ultrasonic vibration processing apparatus 4, for cutting out a plurality of pieces (stacked layer block 1a) having a size for protection glass of portable terminals and for forming long holes 23 and square holes 24 in the respective stacked layer blocks 1a as shown in FIG. 11. After the cut-out of the stacked layer blocks 1a from the stack 1A, which removes all except for the stacked layer blocks 1a from the stack 1A, polish processing for finishing is performed to the periphery of the respective stacked layer blocks 1a, the long holes 23 and the square holes 24. The respective stacked layer blocks 1a remain fixed on the fixing base 21 based on the sucking action. In FIG. 12, as a matter of convenience, the fixing base 21 is scaled down, and the long holes 23 and the square holes 24 formed in the stacked layer block 1a are not shown.

The feedback control is conduced in the polish processing and the grind polishing of the stacked layer block which employs the ultrasonic vibration processing apparatus 4 for bringing the vibration amplitude and the number of vibrations close to the target vibration amplitude and the target number of vibrations, respectively. In order to basically prevent the occurrence of the cracks and the chippings of the tempered glass even if the stress is slightly changed in the tempered glass during the processing, the target vibration amplitude and the target number of vibrations are used which are outside of the range where the value of degrading the quality of the tempered glass (standard of generating cracks and chipping in the tempered glass over specified degrees) is generated, and the value changes along the thickness direction of the tempered glass during the processing.

Specifically, the target vibration amplitude of the processing device 8 is set in the preferable range from 3 μm to 9 μm, for example, 8 μm, and the target number of vibrations of the processing device 8 is set in the preferable range from 60 kHz to 64 kHz, for example, 63 kHz. The reasons why the target vibration amplitude of the processing device 8 is set in the range from 3 μm to 9 μm, and why the target vibration frequency is set in the range from 60 kHz to 64 kHz are mentioned above. The sample cycle of 0.2 msec which is below 0.3 msec is used in the feedback control in this case for properly preventing the generation of the cracks in the tempered glass by rapidly grasping the stress change occurring in the tempered glass and by reducing the stress to the tempered glass.

In this case, the processing device 8 is rotated under the number of rotations of 5000 rpm which belongs to a range from 2000 rpm to 30000 rpm for obtaining preferable effects of the rotation together with sufficiently producing the effects of the ultrasonic vibration processing. The other processing conditions are those ordinarily employed.

(4) Then, after the polish processing, the stacked layer block 1*a* is subjected to the chemical treatment for strengthening the glass end surface by using hydrofluoric acid. Then, the block 1*a* is dipped into warm water, and the respective tempered glasses 1 are peeled off. Thereby, the processed tempered glass can be obtained as a final product (such as protection glass for portable terminal).

EXAMPLES

4. The quality of the test glass prepared by employing the present method (above processing apparatus) and the quality of another test glass of Comparative Example prepared by employing the prior art method were compared with each other and evaluated.

Figure 13:
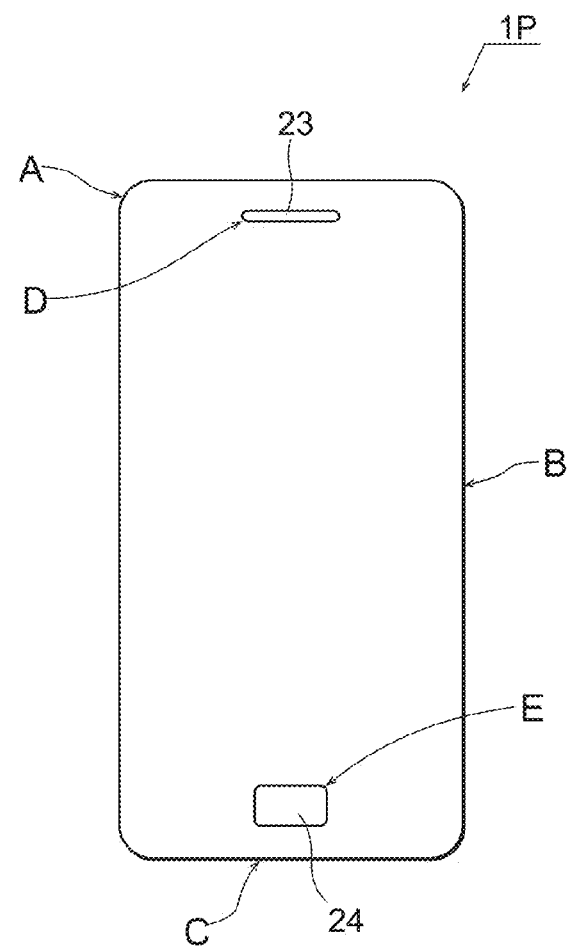
FIG. 13 A view showing a tempered glass for a mobile terminal.
Figure 14:
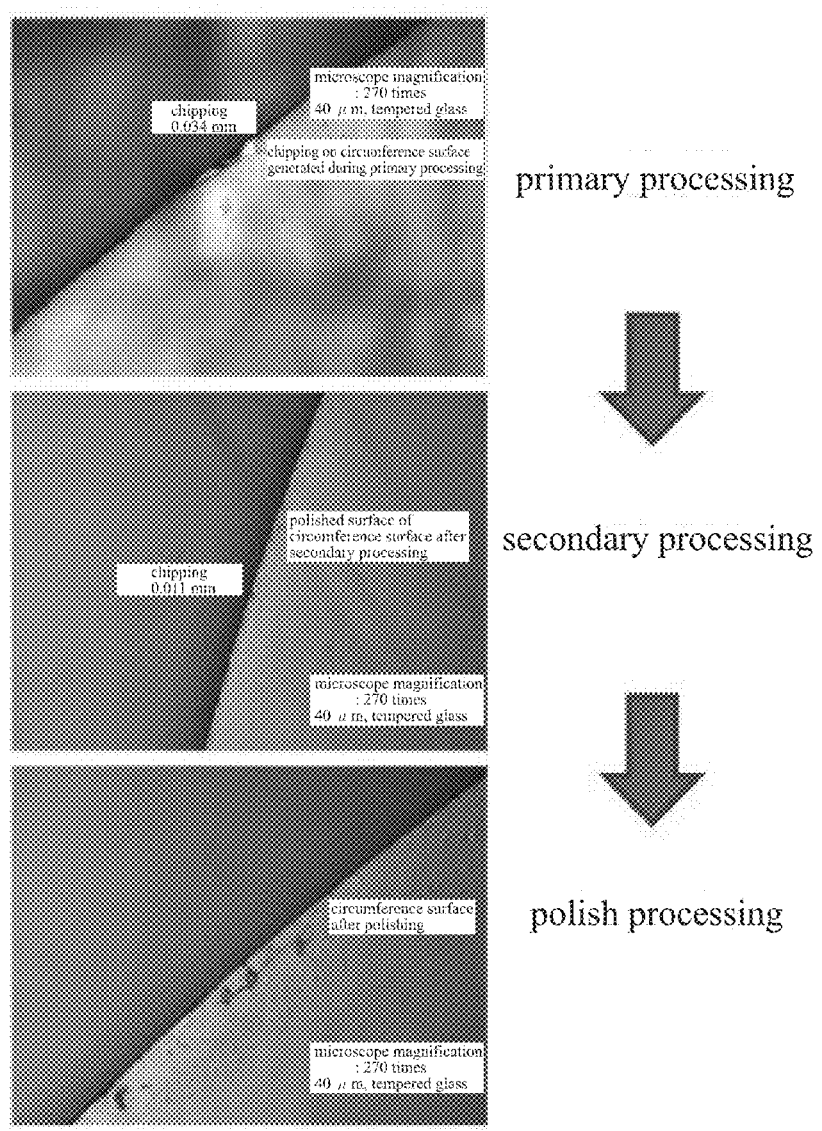
FIG. 14 Magnified photographs showing the part A of FIG. 13 (magnification: 270 times).
Figure 15:
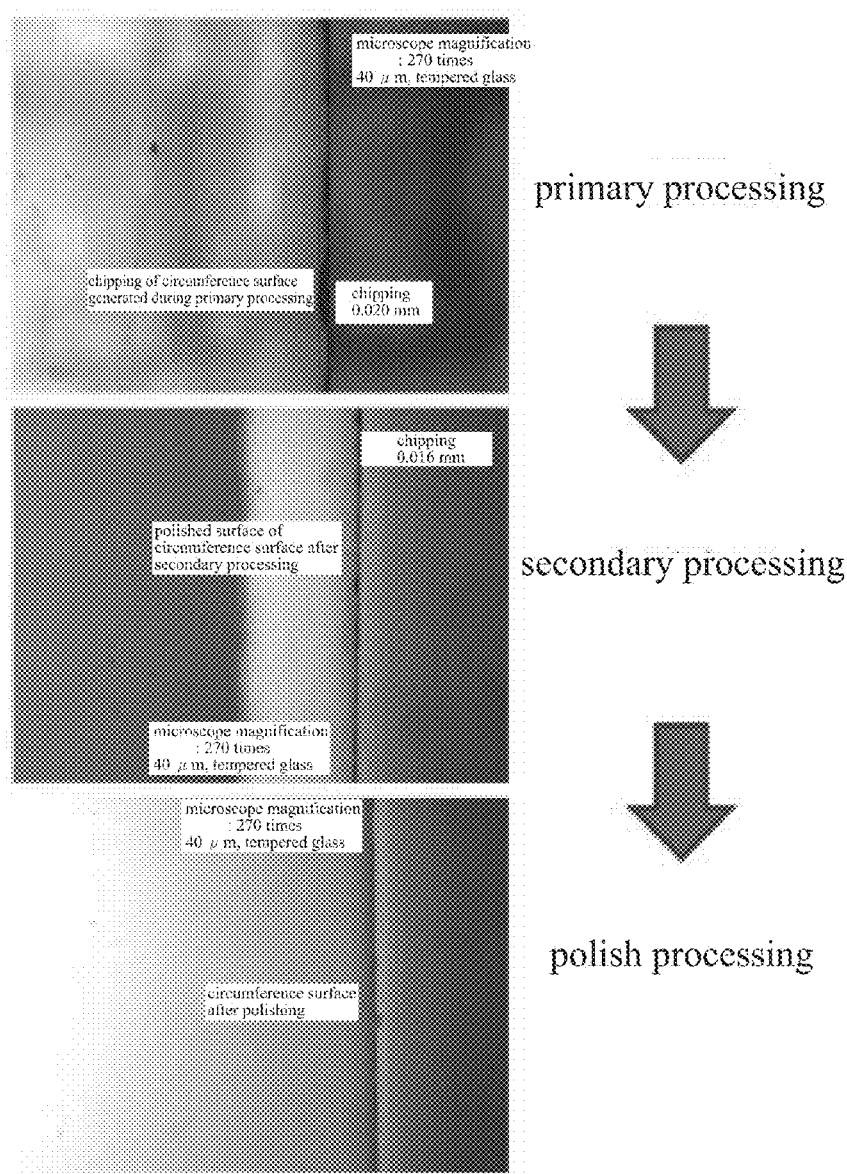
FIG. 15 Magnified photographs showing the part B of FIG. 13 (magnification: 270 times).
Figure 16:
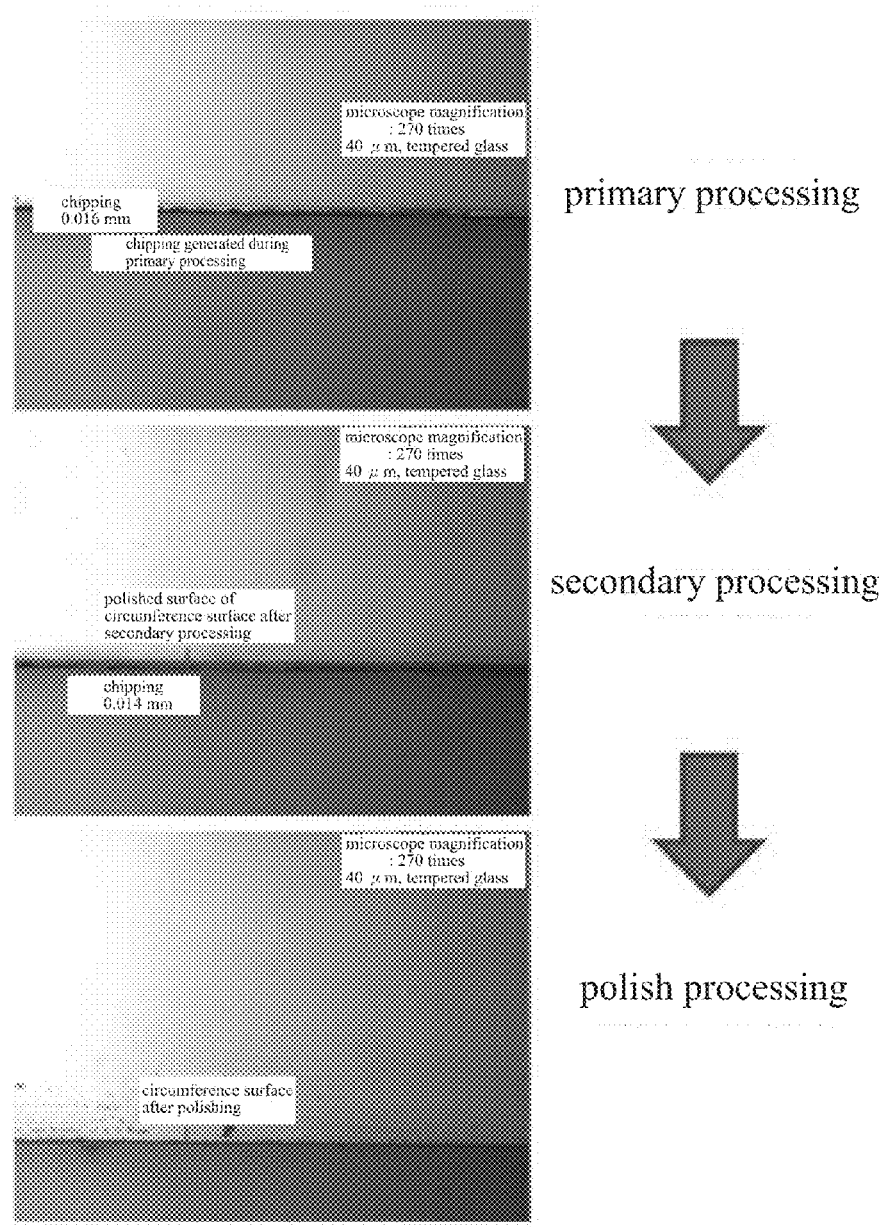
FIG. 16 Magnified photographs showing the part C of FIG. 13 (magnification: 270 times).
Figure 17:
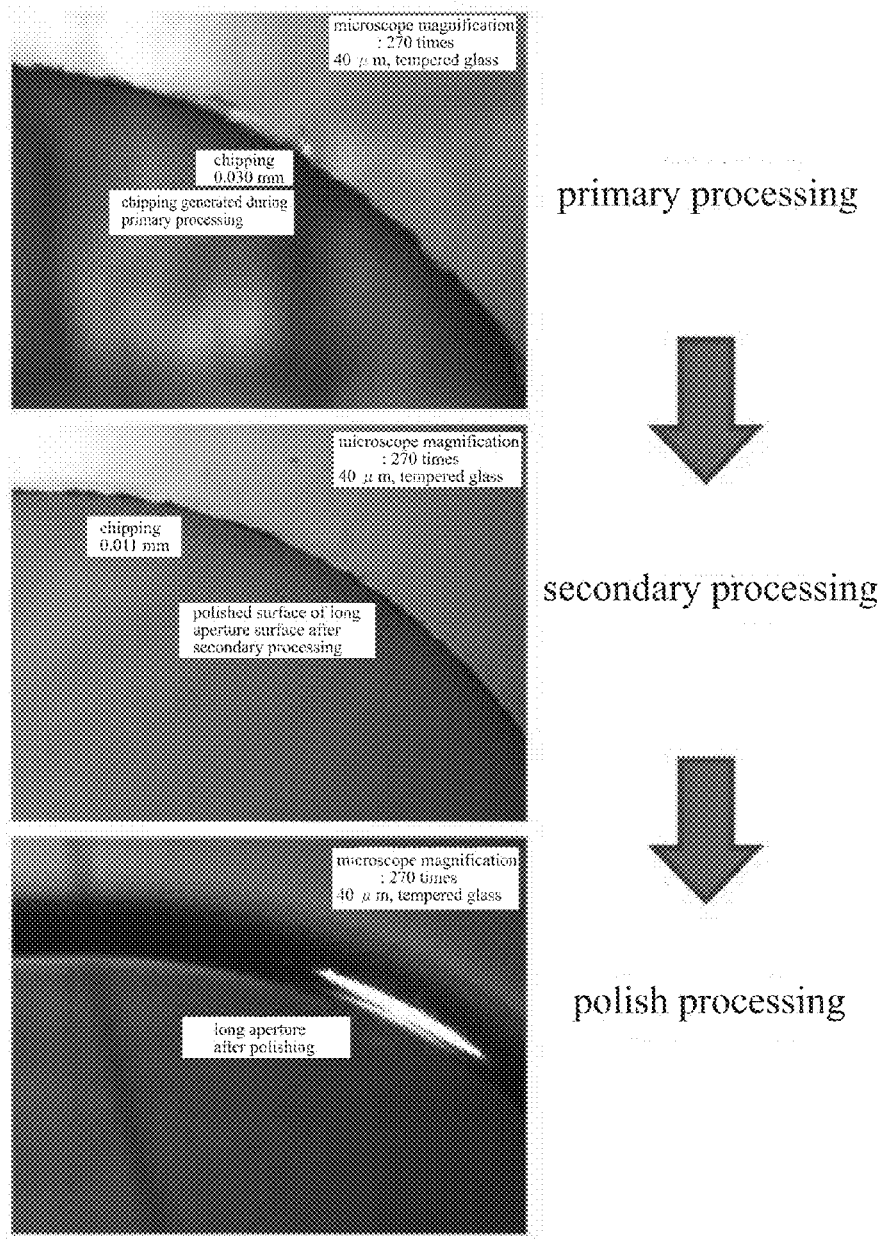
FIG. 17 Magnified photographs showing the part D of FIG. 13 (magnification: 270 times).
Figure 18:
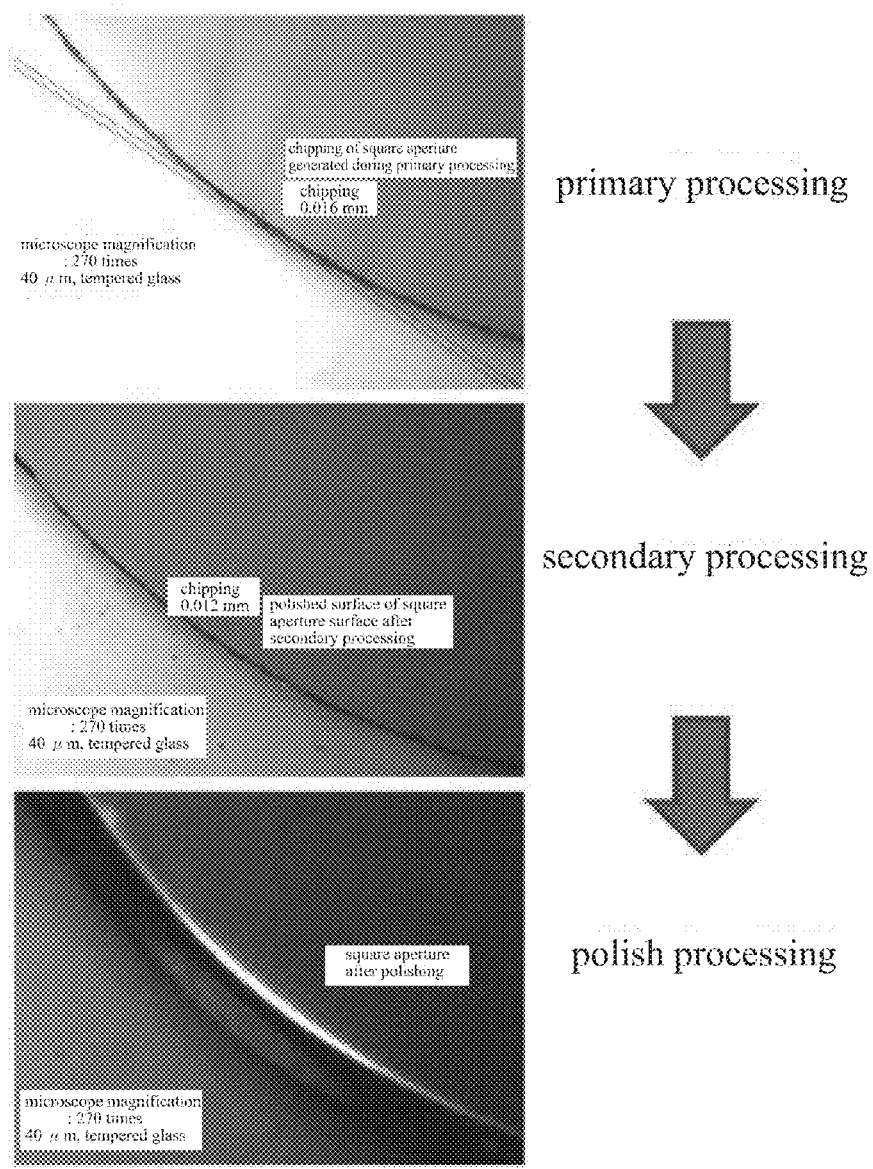
FIG. 18 Magnified photographs showing the part E of FIG. 13 (magnification: 270 times).

(1) In Case of Test Glass Prepared by Employing the Present Method (i) Preparation of Test Glass Preparation of protection glass 1P for portable terminals acting as the test glass and shown in FIG. 13 was attempted.

(ii) Specific Method of Preparing Test Glass of Present Method and Conditions Thereof A method of preparing the test glass is the same as the method of processing the above tempered glass. That is, 12 sheets of the tempered glass (mother material was aluminocilicate glass, thickness of mother material was 0.7 mm, thickness of surface reinforced layer was 40 μm, and surface compression stress was 600 MPa or more) having the surface reinforced layer in the shape of a larger plate were stacked and fixed among one another by using a UV cure adhesive. Pieces (stacked layer block 1*a*) having the same size as that of protection glass of portable terminals were cut out from the stacked sheets. The polish processing (primary processing) of the long holes 23 and square holes 24 was conducted onto the above cut-out pieces to prepare primarily processed articles (stacks). Then, the finishing processing (secondary processing) onto the primarily processed articles was performed for chamfering the circumferential surface, the long holes 23 and the square holes 24 to prepare secondarily processed articles (stacks). Then, the polish processing was conducted onto the secondarily processed articles, and the respective glass plates of the stacked layer block 1*a* after the above processing were dipped into warm water for peeling off, thereby obtaining the test glass (for evaluation).

The above-mentioned ultrasonic vibration processing apparatus 4 was employed in the primary processing and the secondary processing, and the conditions thereof are as follows.

Primary Processing Conditions

Processing Device 8

Type: diamond grind stone in form of shaft (grain size: #320)

Diameter: 1.5 mm

Feed speed: 60 mm/min.

Vibration amplitude: 8 μm

Number of vibrations: 63 kHz

Sample cycle (response speed) of feedback control; 0.2 msec

Number of rotations: 5000 rpm

Secondary Processing Conditions

Processing Device 8

Type: diamond grind stone in form of shaft (grain size: #600)

Diameter: 1.5 mm

Feed speed: 60 mm/min.

Vibration amplitude: 5 μm

Number of vibrations: 63 kHz

Sample cycle (response speed) of feedback control; 0.2 msec

Number of rotations: 5000 rpm (iii) Method of Evaluating Test Glass Prepared by Present Method and Results of Evaluation The processed conditions after the primary processing, after the secondary processing and after the polish processing of the respective parts A to E of the test glasses shown in FIG. 13 were examined.

As apparent from magnified photographs shown in FIG. 14 to FIG. 18 (270 times), the respective parts A to E of the test glass exhibited the excellent processed states in each of the processing stages (after the primary processing, after the secondary processing and after the polish processing).

(2) In Case of Test Glass Prepared by Employing Prior Art Method (i) Preparation of Test Glass Similarly to the case of the test glass prepared by the present method, the preparation of protection glass for portable terminals acting as the test glass shown in FIG. 13 was attempted.

(ii) Specific Method of Preparing Test Glass by Prior Art Method and Conditions Thereof Similarly to the preparation of the present method, the stack consisting of 12 sheets in the shape of larger plates (the tempered glass having the surface reinforced layer) adhered among one another was prepared, and the primary processing (cut-out of the stacked layer block 1*a*, and processing of the long holes 23 and square holes 24) onto the stack under the primary processing conditions below was tried. However, a plurality of cracks were generated after the cut-out of the stacked layer block 1 and in the early stage of processing the long holes 23 during the primary processing. Accordingly, the subsequent processing including the processing of the square holes 24 in the primary processing was abandoned for the parts (refer to part D and part E in FIG. 13) regarding the aperture processing of the test glass of Comparative Example. Although the secondary processing and the polish processing were conducted onto the part B and the part C among the parts with respect to the circumferential surface (refer to part A to part C in FIG. 13) of the test glass of Comparative Example, the subsequent processing of part A was abandoned because of the crack generation.

Primary Processing Conditions

Processing Device 8

Type: diamond grind stone in form of shaft (grain size: #320)

Diameter: 1.5 mm

Feed speed: 60 mm/min.

Vibration amplitude: 8 μm

Number of vibrations: 50 kHz

Sample cycle (response speed) of feedback control; 10 msec

Figure 20:
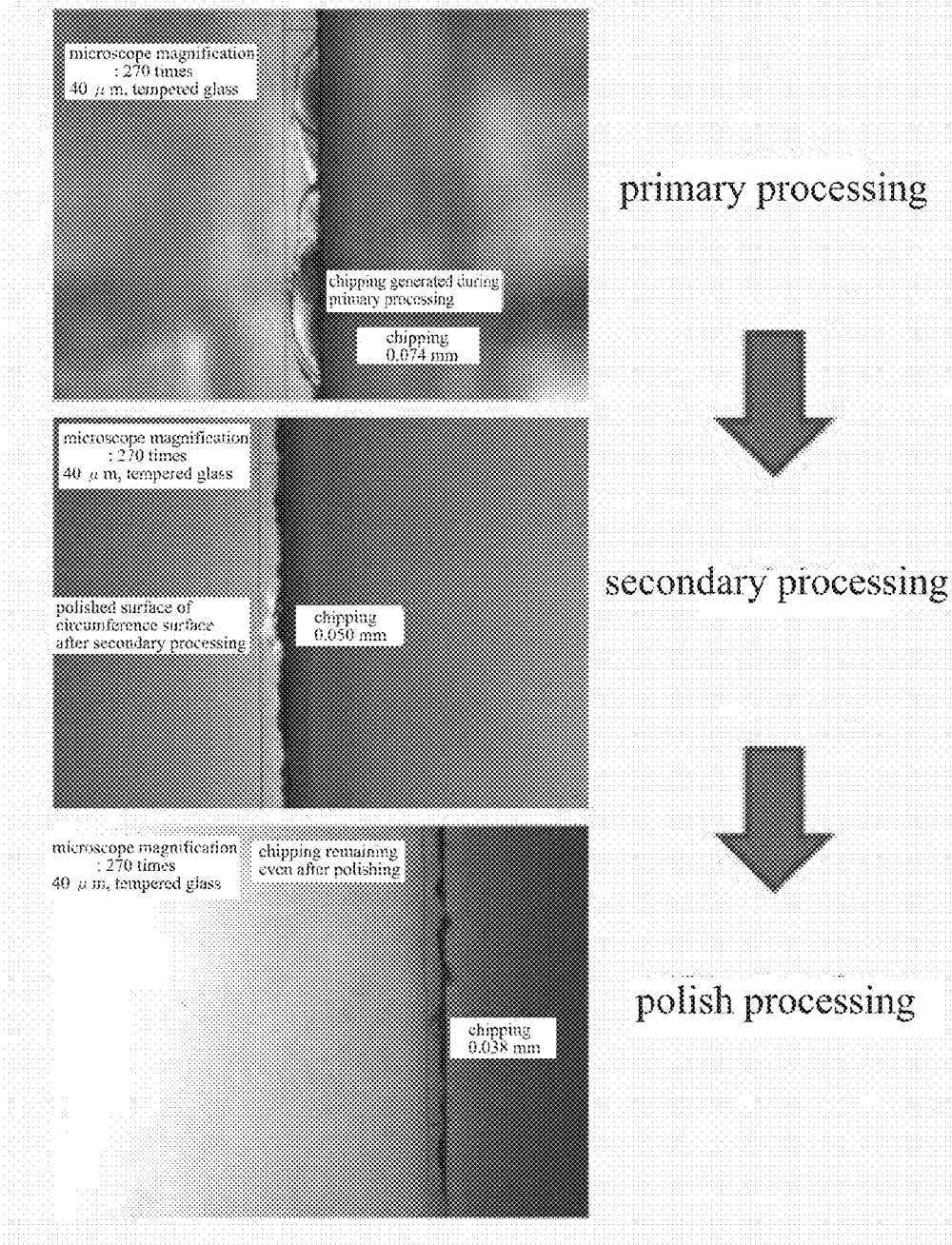
FIG. 20 Magnified photographs showing the part of the protection glass for the portable terminal of Comparative Example which corresponds to the part B of FIG. 13 (magnification: 270 times).
Figure 21:
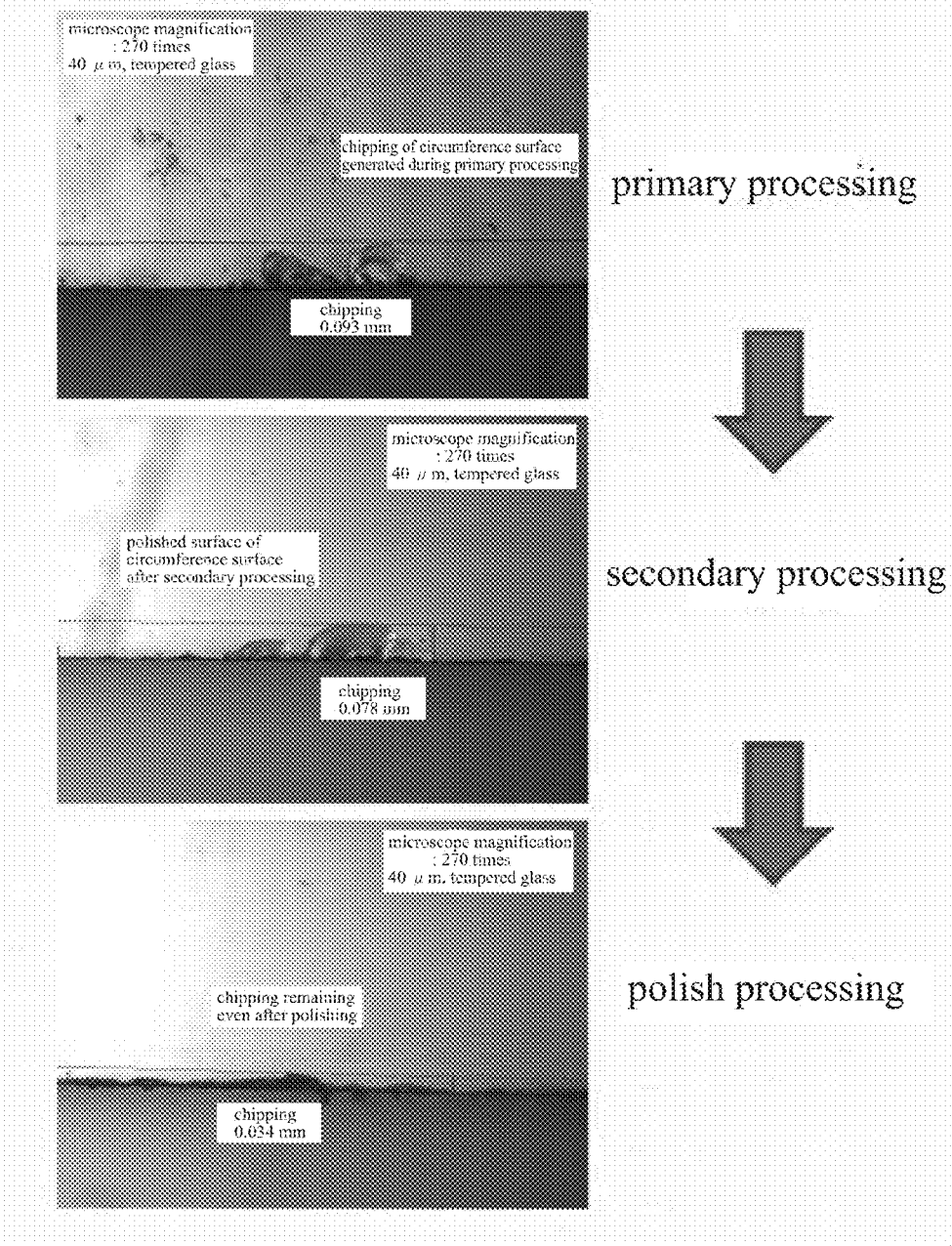
FIG. 21 Magnified photographs showing the part of the protection glass for the portable terminal of Comparative Example which corresponds to the part C of FIG. 13 (magnification: 270 times).
Figure 22:
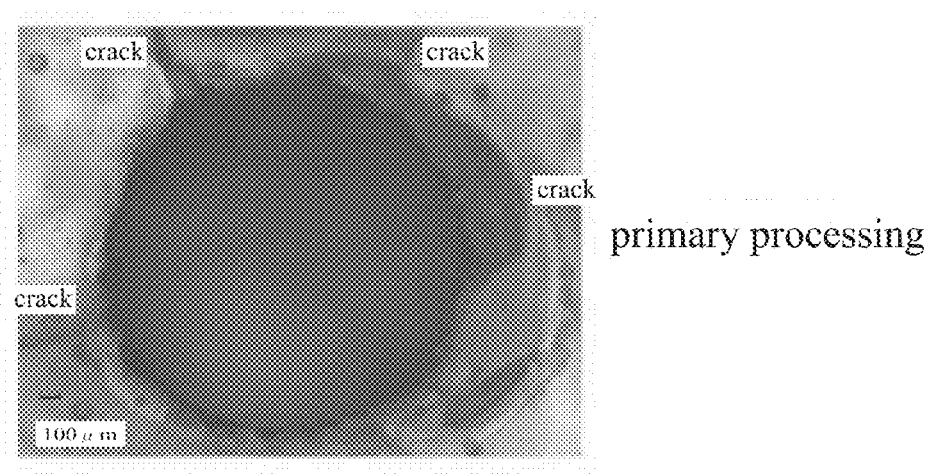
FIG. 22 A magnified photograph showing the part of the protection glass for the portable terminal of Comparative Example which corresponds to the part D of FIG. 13 (magnification: 90 times).

Number of rotations: 5000 rpm (iii) Method of Evaluating Test Glass of Comparative Example and Results of Evaluation Examination of the processed conditions after the primary processing of the respective parts A to D (refer to FIG. 13) of the test glass of Comparative Example provided magnified photographs of FIG. 19 to FIG. 21 (270 times) and of FIG. 22 (90 times). Cracks or chippings over a specified degree were generated at the respective parts A to C of the test glass of Comparative Example, and a plurality of larger cracks were generated at the part D so that the quality thereof was too bad to be supplied as a finished article. A larger central aperture in FIG. 22 was made during the initial stage before the formation of the long holes 23.

5. Ultrasonic Vibration Processing, and Method of its Use.

(1) While the processing device 8 which has been heretofore described is the shaft-shaped diamond grind stone having the flat front end surface 8c, the shaft-shaped diamond grind stone having the flat front end surface with the concave portion 30 on the front end surface 8c as shown in FIGS. 23 to 26 is more preferable as the processing device 8 in view of its durability.

When the processing device having the flat front end surface is employed, the temperature of the flat front end surface rises at the center thereof in the radial direction, the diamond grind grains and their holding surface are gradually carbonized from the center of the front end surface in the radial direction of the processing device toward the outer side. Accordingly, the exfoliation (elimination) of the diamond grind grains and their holding surface is in danger of proceeding so that the durability thereof is attempted to be increased by removing the above problem.

Figure 27:
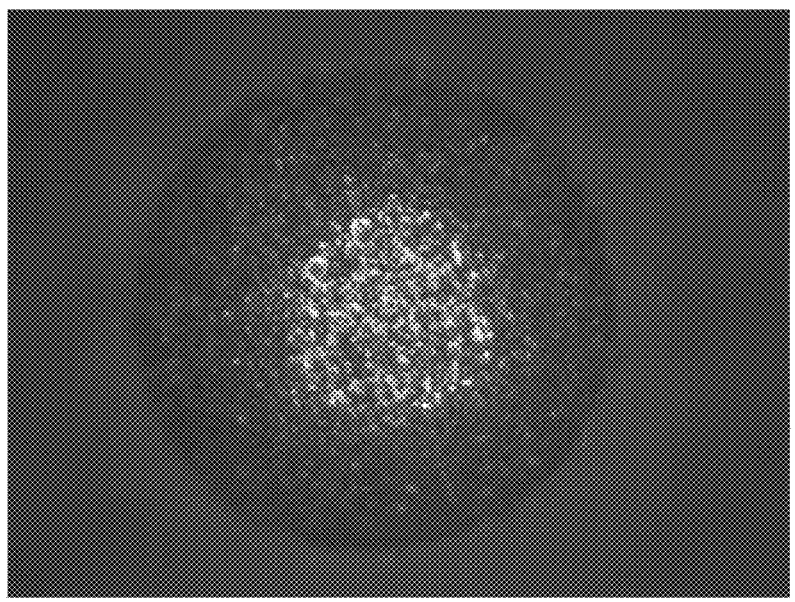
FIG. 27 A magnified photograph showing the part of the unused processing device in which a processing front surface is flat, shot from the processing front surface side (magnification: 270 times).
Figure 28:
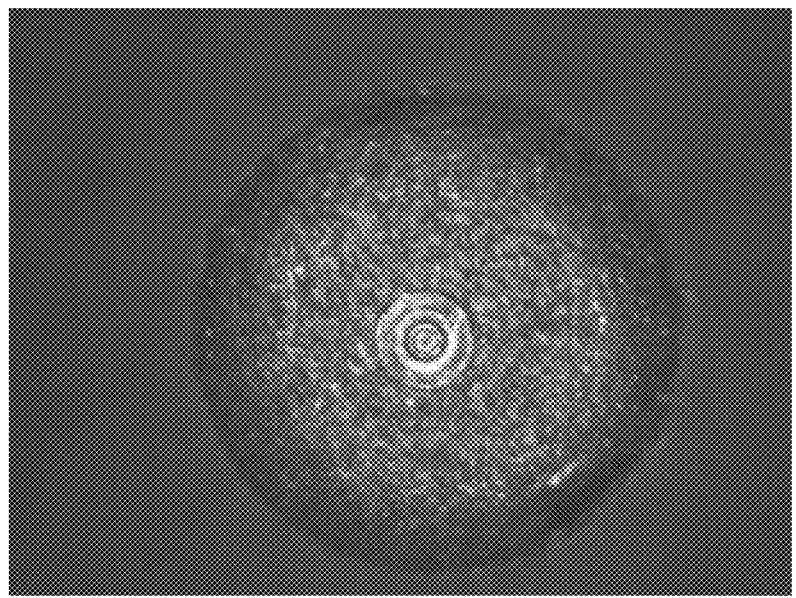
FIG. 28 A magnified photograph showing a deterioration condition under an early stage of the front end surface of the processing device when a penetration aperture of which a size is comparable to the size of the processing device is straightly formed through the tempered glass by using the processing device shown in FIG. 27 (magnification: 270 times).
Figure 29:
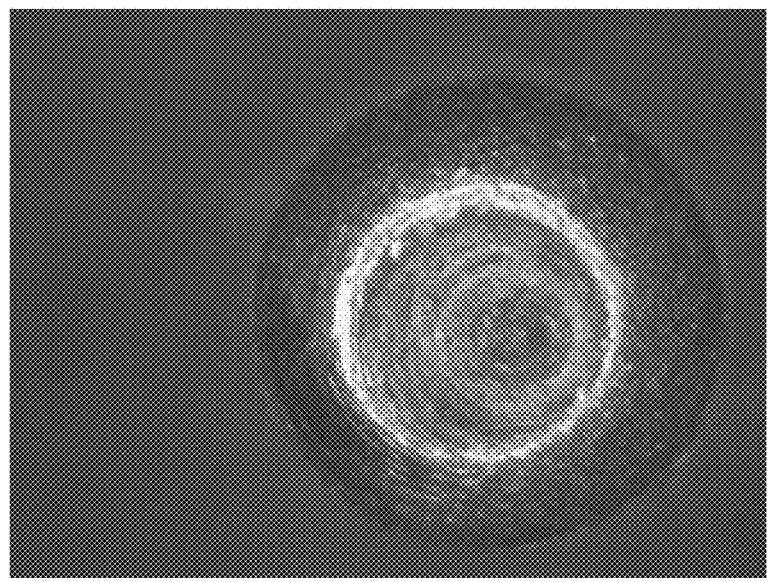
FIG. 29 A magnified photograph showing a deterioration condition of the front end surface of the processing device when a helical processing is employed for the formation of a penetration aperture through the tempered glass by using the processing device shown in FIG. 27 (magnification: 270 times).
Figure 30:
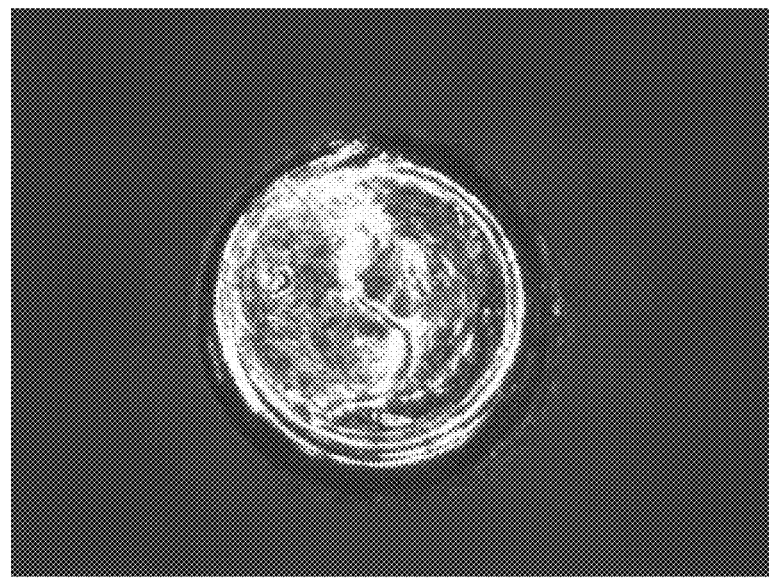
FIG. 30 A magnified photograph showing a condition that diamond grind grains and its holding layer have been exfoliated over a nearly entire front end surface of the processing device with the progress of the further processing from FIG. 29 (magnification: 270 times).

(2) FIGS. 27 to 30 are magnified photographs specifically showing the above situation (the problems of the processing device having the flat front end surface) (magnification: 270 times). FIG. 27 is the magnified photograph of the unused processing device having the flat front end surface, shot from the processing front surface side. While, in FIG. 27, the center of the processing device in the radial direction is whiter than its surrounding, this whitening is caused by the influence of light reflection. FIG. 28 is the magnified photograph showing a deterioration condition under an early stage of the front end surface 8c of the processing device when a penetration aperture of which a size is comparable to the size of the processing device is formed through the tempered glass by straightly descending the processing device (having the flat front end surface) shown in FIG. 27 under vibration and rotation (under ultrasonic vibration processing). The state of the exfoliation of the diamond grind grains and its holding surface in the center of the front end surface 8c of the processing device and of the exposure of the base material on the above position can be seen in FIG. 28 (refer to a part which is seen as a plurality of concentric parallel grooves and is depicted in white in the central part of the front end surface 8c of the processing device in the radial direction). FIG. 29 is a magnified photograph showing a deterioration condition of the front end surface 8c of the processing device when a helical processing (the processing in which the processing device 8 is moved and descended while it is inscribed to an inner circumference-scheduled line of the penetration aperture during the formation of the penetration aperture slightly larger than the diameter of the processing device) is conducted for the formation of a penetration aperture through the tempered glass by using the processing device shown in FIG. 27. In FIG. 27, the carbonization and the exfoliation of the diamond grind grains and its holding layer spread in the shape of a circle having a center gradually deviated from its central part in the radial direction while keeping the central part in the radial direction of the front end surface of the processing device as the center (refer to inside of a white circle in FIG. 29). The progress of the carbonization and the exfoliation of the diamond grind grains and its holding layer is remarkable with an approach to the central part in the radial direction of the front end surface 8c of the processing device. FIG. 30 is a magnified photograph showing a deterioration condition of the front end surface 8c of the processing device after further processing from the state of FIG. 29. In FIG. 30, a state of the exfoliation of the diamond grind grains and its holding layer is shown in the nearly entire front end surface 8c of the processing device.

As apparent from FIGS. 27 to 30, especially in FIG. 28 and FIG. 29, it can be comprehended that the temperature rise of the front end surface 8c is centered at the central part (diamond grind grains) in the radial direction of the front end surface in the processing device 8 having the flat front end surface 8c, and the carbonization and the exfoliation of the diamond grind grains and its holding layer progress outwardly from the central part.

(3) The present inventor currently considers this phenomenon as follows.

(i) While numberless diamond grind grains are held on the front end surface 8c of the processing device, amounts of projection of the respective diamond grind grains from the front end surface 8c are different from one another though very little amounts. It is regarded that an amount of attrition of the respective diamond grind grains during the processing of the tempered glass 1, in consideration of the collision with the tempered glass 1 during the vibration and of the friction based on the rotation of the processing device, increases toward the outer side in the radial direction of the front end surface 8c and is least at the central part (center) in the radial direction of the front end surface 8c. At the outer side in the radial direction of the front end surface 8c, a rotating force of the processing device (a circumferential velocity is higher at the out side in the radial direction) in addition to a collision force with the tempered glass based on vibration of a vibrating device is exerted on the tempered glass 1 so that it is considered that an amount of attrition of the diamond grind grains increases at the exerted point. On the other hand, since the rotation force of the processing device 8 scarcely works as the friction force on the central part in the radial direction of the front end surface 8c (a circumferential velocity is zero at the shaft center of the processing device 8), only the collision force with the tempered glass 1 based on the vibration of the vibrating device is exerted on the diamond grind grains on the central part of the front end surface 8c so that the amount of the attrition of the diamond grind grains thereon is considered to be small.

Figure 31:
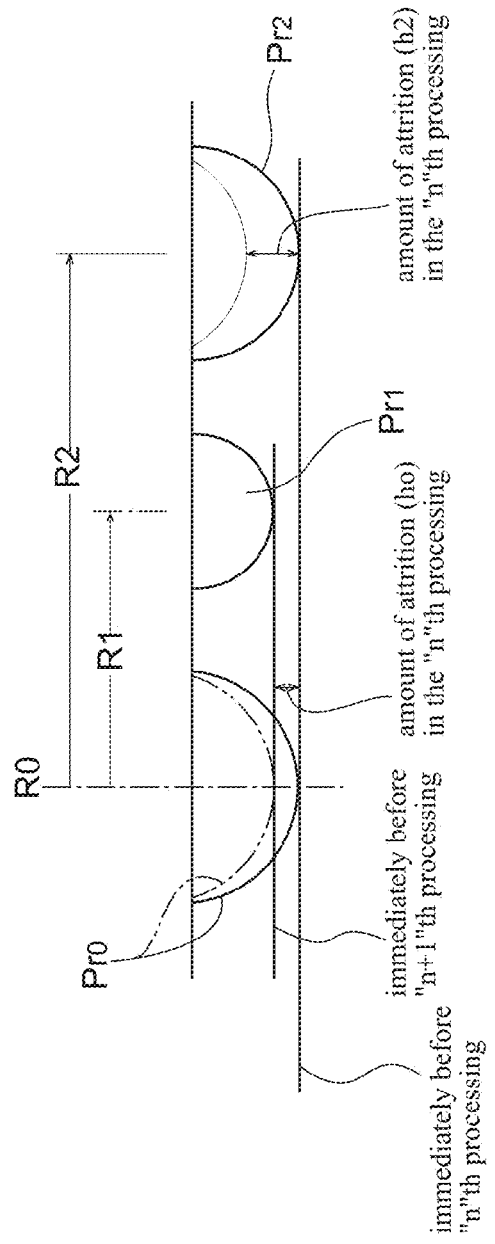
FIG. 31 A view showing a simplified model explaining concentration of heat to a central part in a radial direction of a flat processing front surface in the processing device having the flat front end surface of the processing device.

(ii) Based on such an assumption, as shown in FIG. 31 (conceptional view), the diamond grind grains positioned at the central part (center) RO in the radial direction of the front end surface 8*c*, at a position separated by a radius R1 from the central part (center) R0 in the radial direction, and at a position separated by a radius R2 are defined to be Pr0, Pr1 and Pr0. A simplified model is supposed in which, among the three diamond grind grains, those having the largest projecting amounts from the front end surface 8*c* at a certain moment are Pr0 and Pr2. When, in this state, the processing device 8 newly collides with the tempered glass 1 based on the vibration (supposed to be "n"th processing), the amount of the attrition of the diamond grind grains Pr0 is a minimum of h0, and the amount of the attrition of the diamond grind grains Pr2 is h2 larger than h0. Between the diamond grind grains Pr1, Pr2 existing on the outer side in the radius direction of the front end surface 8*c*, the diamond grind grains having the largest projecting amount from the front end surface 8*c* is replaced from Pr2 to the new diamond grind grains Pr1 under this stage (immediately after "n"th processing), and the diamond grind grains having the largest projecting amount on the front end surface 8*c* are Pr0 and Pr1. Accordingly, in the next processing ("n+1"th processing), the processing device 8 collides with the tempered glass via the diamond grind grains Pr0 on the central part in the radial direction of the front end surface 8*c* and the new diamond grind grains Pr1 on the outer side in the radial direction of the front end surface 8*c*. Hereafter, in this manner, while the diamond grind grains colliding with the tempered glass on the central part in the radial direction of the front end surface 8*c* are not replaced, those on the outer side in the radial direction of the front end surface 8*c* are replaced in every collision.

Figure 32:
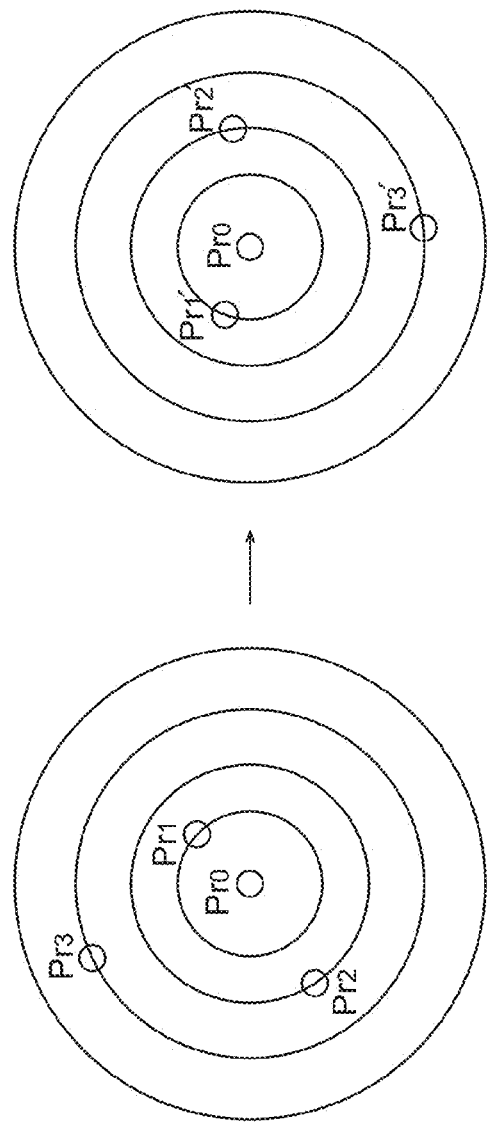
FIG. 32 Explanatory views showing replacement of diamond grind grains with each collision against the tempered glass except for the central part in the radial direction of the processing front surface.

(iii) This can be also applied to the concyclic points of the respective radii having the center in the radius direction (central part) on the front end surface 8*c*. That is, as apparent from the conceptional view shown in FIG. 32, if the diamond grind grains colliding with the tempered glass 1 are Pr1, Pr2 and Pr3 at a certain stage (immediately before "n"th processing) on the concyclic points of the respective radii situated lateral to the center in the radial direction of the front end surface 8*c*, the different diamond grind grains Pr1', Pr2' and Pr3' (having the largest amounts of projection) are subjects of the collision at the next collision ("n+1"th processing), and a probability is low in which the same diamond grind collide with the tempered glass in every collision. On the other hand, at the center in the radial direction of the front end surface 8*c*, the diamond grind grains Pr0 are not replaced, and a probability of the collision of the above diamond grind grains Pr0 with the tempered glass 1 is considerably high.

(iv) Based on the above, the present inventor considers that large generation heat during the collision is concentrated to the diamond grind grains Pr0 on the center in the radius direction on the front end surface 8*c*, and the carbonization of the diamond grind grains starts centering the above center, which gradually extends to the outer side in the radial direction of the front end surface 8*c*.

(v) Based on such a consideration, the present inventor has conceived the formation of the concave portion 30 on the central part in the radial direction of the front end surface 8*c* for preventing the concentration of the heat to the diamond grind grains on the central part in the radial direction of the front end surface 8*c* by removing the collision between the diamond grind grains and the tempered glass 1, thereby completing the present invention. The processing device 8 to which improvement is applied in view of the above durability will be specifically described.

In this case, an inner diameter and a depth of the concave portion formed on the central part in the radial direction of the front end surface 8*c* are not especially restricted under the circumstances that the collision probability between the diamond grind grains and the tempered glass 1 can be reduced while the processability is secured.

Figure 23:
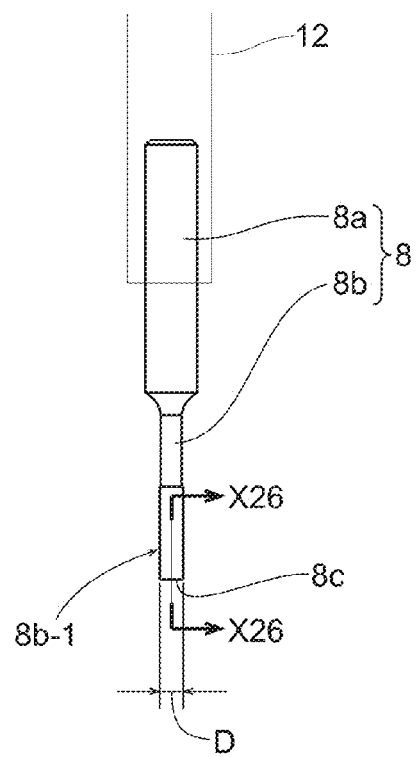
FIG. 23 A front elevational view showing a preferable shaft-shaped processing device.

(4) As shown in FIG. 23, the processing device 8 includes a larger size section 8*a* extending from a base section (a part connected to the above-mentioned amplification section of the unit 12 for generating ultrasonic vibrations) to a position about half the entire length, and a smaller sized section 8*b* having a reduced diameter extending from the larger size section 8*a* to the front end of the processing device 8. In the smaller sized section 8*b*, a region (front section) from the front end to a position about half the length is constituted as a diamond electro-deposited section 8*b*-1. In order to form the outer surface of holding the diamond grind grains, the diamond grind grains are held on the diamond electro-deposited section 8*b*-1 by utilizing a holding layer (plated layer, not shown) on its periphery surface and the front end surface (the front end surface 8*c* of the processing device) (specifically, held (adhered) on the base material by the holding layer). The grain size of the diamond grind grains includes various sizes such as #600 and #1000 which are suitably used depending on subjects to be processed.

Figure 24:
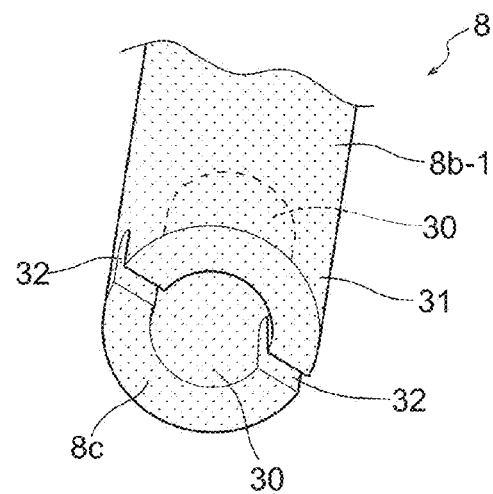
FIG. 24 A partially enlarged perspective view of the processing device shown in FIG. 23 viewed from the front side thereof.
Figure 25:
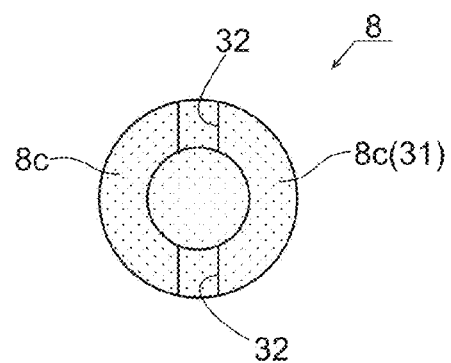
FIG. 25 An enlarged view showing the front end of the processing device shown in FIG. 23.
Figure 26:
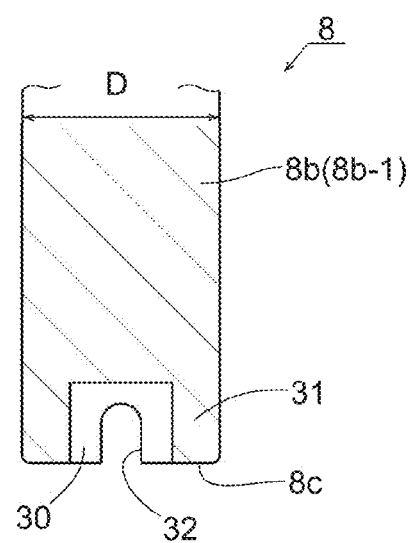
FIG. 26 An enlarged sectional view taken along a line X26-X26 of FIG. 23.

As shown in FIGS. 24 to 26, the concave portion 30 is formed on the front end surface 8*c* of the processing device 8. The concave portion 30 is formed as a circular aperture having the same shaft center as that of the diamond electro-deposited section 8*b*-1, and the surrounding of the concave portion (circular aperture) 30 is sectioned by a circumferential wall 31 of forming the concave portion. Specifically, the diameter of the concave portion 30 is established to be about ⅓ to ½D with respect to the diameter D of the diamond electro-deposited section 8*b*-1, and the depth of the concave portion 30 is established to be from about the diameter of the concave portion 30 to about 1.5 times the diameter of the concave portion 30. The diamond grind grains are also held on the inner surface of the concave portion 30 in the processing device 8.

As shown in FIGS. 24 to 26, slits 32 acting as connecting apertures of connecting the inside and outside of the concave portion 30 are formed through the circumferential wall 31 of forming the concave portion. A pair of the slits 32 are formed and opposed with each other, and extend from the front end surface 8*c* to the inner side in the direction of extending the shaft center of the processing device 8. In this embodiment, the lengths in the direction of extension of these slits 32 are set to be shorter than the depth of the concave portion 30 (for example, the lengths are slightly longer than half the depth of the concave portion 30), and the widths of the slits 32 are set to be shorter than the lengths in the direction of extending the slits 32.

While the processing device 8 is connected to the amplification section of the unit 12 for generating ultrasonic vibrations of the ultrasonic vibration processing apparatus 4 and used, the apparatus 4 is equipped not only with the elevating apparatus 10 (refer to FIG. 2) which moves up and down the housing 6 but also with a moving apparatus (not shown) which moves the housing 6 including the elevating apparatus 10 from front to back and from side to side. The movement of the moving apparatus is controlled by the control unit U (refer to FIG. 3) based on the set contents.

Figure 33:
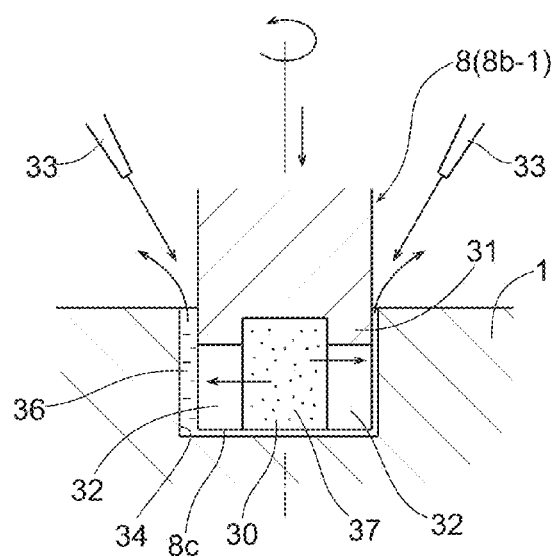
FIG. 33 An explanatory view showing the processing of the tempered glass by using a preferable processing device.
Figure 34:
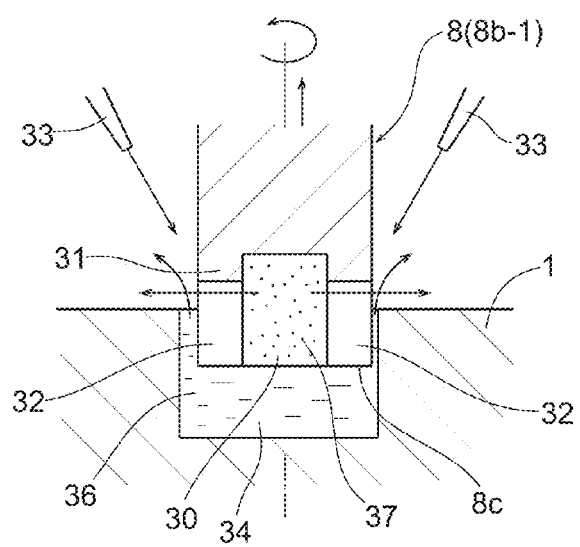
FIG. 34 An explanatory view showing an operation condition change from FIG. 33.

As shown in FIGS. 33 and 34, the apparatus 4 is equipped with a liquid pouring apparatus 33 for pouring a grinding liquid. The liquid pouring apparatus 33 has a function of pouring the grinding liquid to a vicinity of a position of the tempered glass to be processed by the processing device 8, and thereby the grinding liquid from the liquid pouring apparatus 33 cools the tempered glass 1 and the processing device 8 and further compulsorily and externally discharges cut scrap produced in a hole 34 during the processing.

(5) Then, the description will be centered to a method of using the processing device 8 when a penetration aperture is formed through the tempered glass by using the ultrasonic vibration processing apparatus 4 equipped with the above processing device 8.

(i) At first, the formation of a straight penetration aperture through a stack prepared by bonding a plurality of the tempered glass 1 in a stacked state by means of an adhesive agent will be described (As a matter of convenience, the stack will be hereinafter also referred to as "tempered glass 1").

(a) As shown in 35, in this case, the processing device 8 is selected depending on the diameter of a penetration aperture 35 formed through the tempered glass 1, and the processing device 8 of which a diameter is slightly smaller than that of the penetration aperture 35 formed through the tempered glass 1 is selected.

Figure 35:
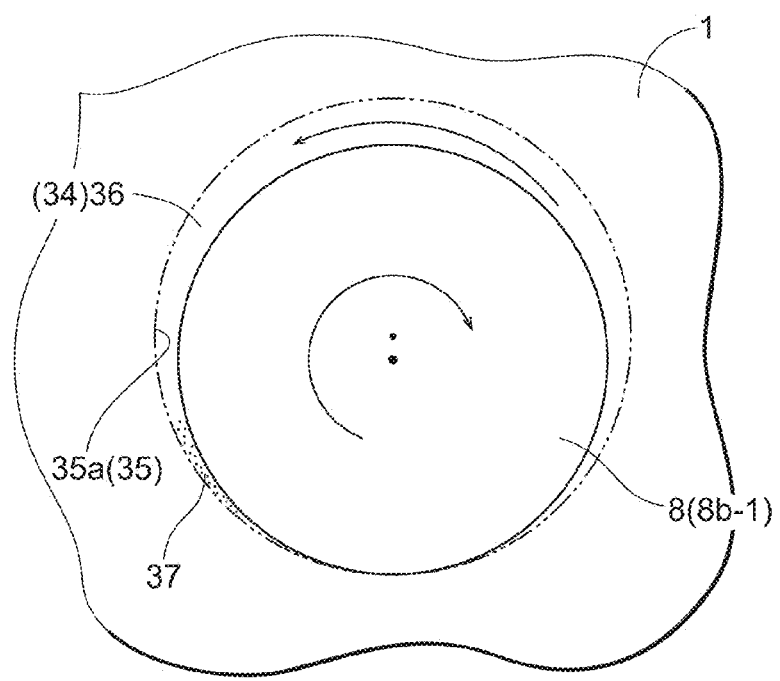
FIG. 35 An explanatory view showing the operation of the processing device performing a helical processing together with an ultrasonic vibration processing in a planer manner.

As shown in FIG. 35, for the formation of the penetration aperture 35, after the position of forming the penetration aperture 35 is determined on the tempered glass 1, an inner circumference-scheduled line 35a (the set content set in the control unit U for the processing) of the penetration aperture 35 is established on the tempered glass 1, and then a helical processing is conducted in which the processing device 8 is moved and descended while it is inscribed to the inner circumference-scheduled line 35a of the penetration aperture 35. Of course, during the movement, the ultrasonic vibration processing is conducted, and the direction of rotation of the processing device 8 at this stage is such that the processing device 8 proceeds to the inner circumference-scheduled line 35a of the penetration aperture 35 to be formed through the tempered glass 1 after the movement (so-called down-cut processing). Accordingly, the entire portion inside of the inner circumference-scheduled line 35a of the penetration aperture 35 is ground by the front top surface 8c (diamond grind grains) of the processing device 8 which moves and descends under the vibration and the rotation so that a hole 34 is gradually dug inside of the inner circumference-scheduled line 35a of the penetration aperture 35 in the tempered glass 1. Accompanied therewith, the side surface of the processing device 8 performs the down-cut processing (grinding) on the inner periphery surface of the hole 34 during the processing. The processing device 8 penetrates the tempered glass 1 by means of the processing of this processing device 8 so that the penetration aperture 35 is formed through the tempered glass 1.

(b) The front end surface 8c (diamond grind grains) of the processing device 8 collides with the tempered glass 1 by means of the vibration (ultrasonic vibration processing) in this proceeding, and the concave portion 30 is formed on the central part in the radial direction of the front top surface 8c as shown in FIGS. 24 to 26. Accordingly, the collision between the central part in the radial direction of the front top surface 8c and the tempered glass by means of the vibration of the processing device 8 can be prevented so that the concentration of the generated heat on the central part of the front end surface 8c (diamond grind grains) by means of the collision with the tempered glass 1 can be prevented. As a result, the carbonization and the exfoliation (elimination) of the diamond grind grains and their holding of the processing device 8 are suppressed on the central part in the radial direction of the front end surface 8c as well as in the outer side in the radial direction from the central part.

(c) In this processing, a space 36 for discharging cut scrap is formed at the back of the moving direction of the processing device 8 between the hole 34 and the processing device 8 because of the relation between the diameters of the inner circumference-scheduled line 35a of the penetration aperture 35 in the tempered glass 1 and of the processing device 8. Accordingly, the cut scrap 37 generated during the down-cut processing to the inner peripheral surface of the hole 34 by means of the side surface of the processing device 8 is smoothly discharged to the discharge space 36 behind the moving direction of the processing device 8 as shown in FIG. 35, and the generation of chipping by involution of the cut scrap 37 on the inner peripheral surface of the hole 34 during the processing is suppressed.

(d) As shown in FIGS. 33 and 34, in the above processing, the cut scrap 37 enters into the concave portion 30 of the processing device 8 accompanied with the processing. The cut scrap 37 is likely to damage the processed surface by colliding against the processed surface so that the cut scrap 37 in the concave portion 30 is required to be promptly discharged. For this purpose, a pair of the slits 32 are formed through the circumferential wall 31 of forming the concave portion, and the cut scrap 37 in the concave portion 30 is discharged through the respective slits 32 to the hole 34 being formed by means of the centrifugal force based on the rotation of the processing device 8 and in addition the cavitation (vibration based on crash of bubbles in the grinding liquid) in the grinding liquid generated by the ultrasonic vibration of the processing device 8 in the hole 34 during the processing to which the grinding liquid is always supplied. The cut scrap 37 discharged to the hole 34 during the processing from the slits 32 is effectively discharged outwardly by means of a pumping function generated based on the flow of the grinding liquid and the ultrasonic vibration of the processing device 8 in the hole 34.

In this manner, the chipping occurring by the remaining of the cut scrap 37 in the hole 34 can be prevented in advance during the formation of the penetration aperture 35.

(e) Although, in the above embodiment, the penetration aperture 35 is formed by using the helical processing to the tempered glass 1, the penetration aperture 35 can be formed through the tempered glass 1 by straightly descending the processing device 8 under the ultrasonic vibration without using the helical processing. In this case, no problem arises with respect to the concentration of the heat on the front end surface 8c similarly to the helical processing until the tempered glass 1 collides with the bottom of the concave portion 30 of the processing device 8. However, in this processing after the tempered glass 1 collides with the bottom of the concave portion 30, the heat is concentrated with higher possibility so that this processing is inferior to the helical processing in this respect. Accordingly, the tempered glass 1 to be processed preferably has a thickness shorter than the depth of the concave portion 30.

Figure 36:
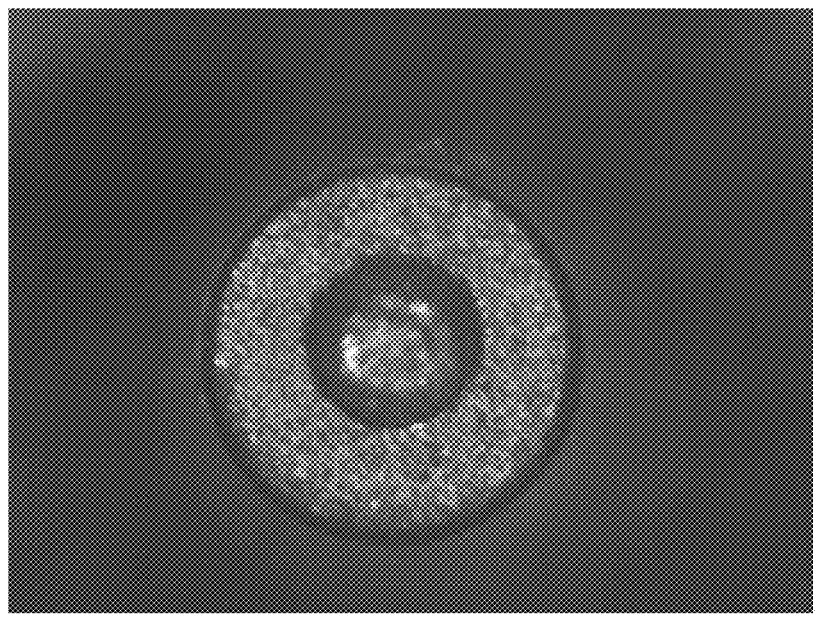
FIG. 36 A magnified photograph showing an unused processing front end surface of the processing device (preferable processing device) in accordance with the embodiment (magnification: 270 times).

(f) FIG. 36 is a magnified photograph showing the processing device 8 of the embodiment under an unused state having a concave portion on the central part in the radial direction of the front end surface shot from the processing front surface side (magnification: 270 times). In FIG. 36, an annular black portion and a black and white pattern inside of the annular black portion on the central part in the radial direction of the front end surface of the processing device designate inside of the concave portion, and outside of the annular black portion designates the front end surface 8c excluding the concave portion.

Figure 37:
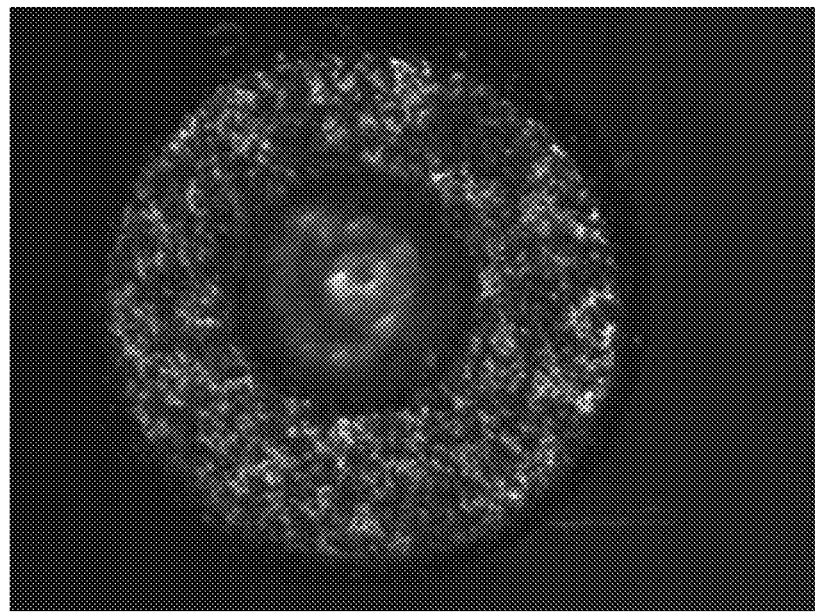
FIG. 37 A magnified photograph showing a processing front end surface of the processing device after use (preferable processing device) in accordance with the embodiment (magnification: 270 times).

FIG. 37 is a magnified photograph showing the front end surface 8c of the processing device 8 when 100 or more holes are formed through the tempered glass having various surface reinforced layers by using the processing device 8 of FIG. 36 (magnification: 270 times). If this processing is carried out by using the processing device having a flat front end surface, the exfoliation of the diamond grind grains and their holding layer takes place. In FIG. 37, the exfoliation of the diamond grind grains and their holding layer is scarcely observed, and it can be conformed that the processing device 8 having the concave portion 30 on the front end surface includes more durability than the processing device 8 having the flat front end surface.

(ii) Then, the formation of a long hole through the tempered glass will be described.

Figure 38:
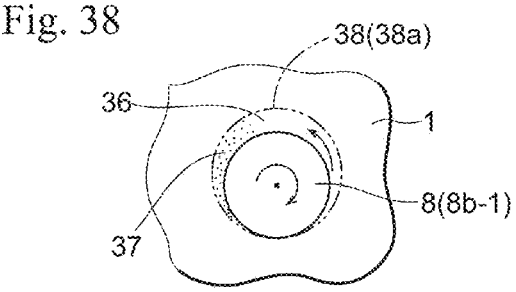
FIG. 38 An explanatory view showing the formation of the long hole by using the processing device in accordance with the embodiment.
Figure 42:
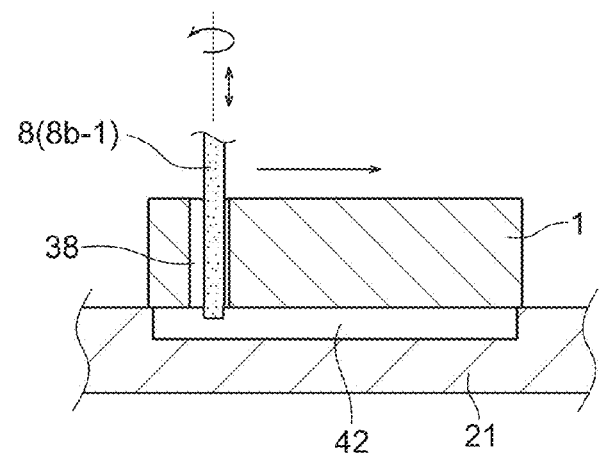
FIG. 42 A vertical sectional view showing the processing of a start hole.

As shown in FIGS. 38 and 42, for forming the long hole through the tempered glass 1, at first, a start hole 38 is formed through the tempered glass 1 fixed on a fixing base 21. For the formation of this start hole 38, similarly to the formation of the above penetration aperture 35, after an inner circumference-scheduled line 38a of a penetration aperture 38 is established on the tempered glass 1, the helical processing (the processing in which the processing device 8 is moved and descended while it is inscribed to an inner circumference-scheduled line of the start hole 38) is conducted by using the processing device 8 under the vibration (ultrasonic vibration processing) and the rotation. In this case, the inner circumference-scheduled line 38a of the penetration aperture 38 is included in the inner circumference-scheduled line of the long hole formed through the tempered glass 1.

Figure 39:
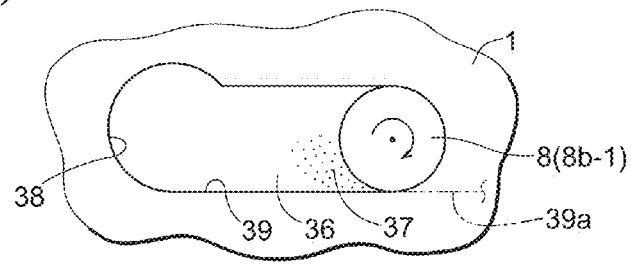
FIG. 39 An explanatory view showing a step next to the step of FIG. 38.
Figure 40:
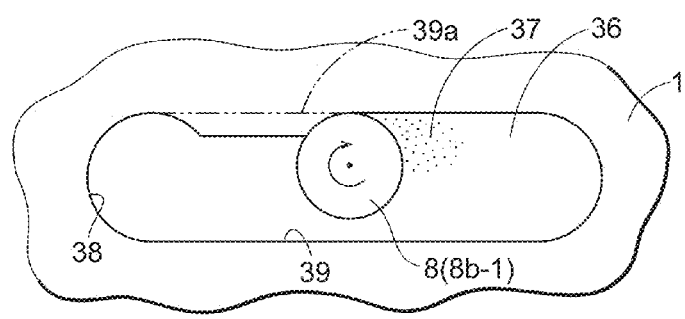
FIG. 40 An explanatory view showing a step next to the step of FIG. 39.

(b) When the start hole 38 is formed, the state in which the processing device 8 is penetrated through the start hole 38 is maintained (FIG. 42). Using this state as the start of the subsequent processing by using the processing device 8, the processing is conducted by moving the processing device 8 which is internally inscribed to an inner circumference-scheduled line of the start hole 39a of the long hole 39 while utilizing the side surface of the processing device 8 as a polishing surface as shown in FIGS. 39 and 40. At this stage, the rotating direction of the processing device 8 is that in which it rotates toward the respective inner circumference-scheduled lines 38a, 39a of the long hole 39 and the start hole 38 in the moving side of the processing device 8, and the down-cut processing to the tempered glass 1 is conducted for setting the inner circumference-scheduled lines of the long hole 39 as a processing limit. In this manner, the cut scrap accompanied with the processing can be smoothly discharged to a discharging space 36 behind the moving direction of the processing device 8, and the long hole can be processed while the chipping caused by the inclusion of the cut scrap can be suppressed.

In FIG. 42, a reference 42 designates a trench formed on the fixing base 21, and the front end part of the processing device 8 does not interfere with the fixing base 21 during the movement for forming the long hole 39 because of the presence of the trench 42.

Figure 41:
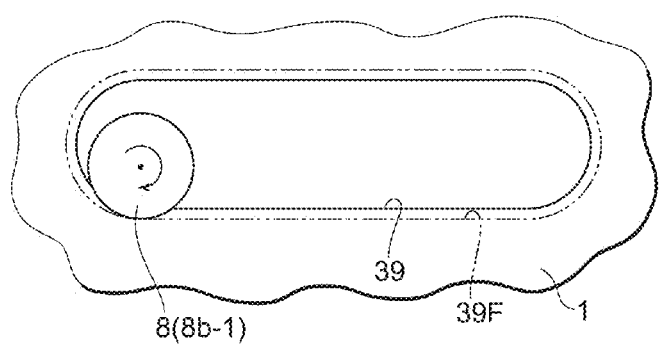
FIG. 41 An explanatory view showing a step next to the step of FIG. 40.

(c) While, basically, the formation of the long hole 39 is finished by the above processing, a finish processing may be further conducted by utilizing the side surface of the processing device 8 in the present embodiment as shown in FIG. 41 (in FIG. 41, an imaginary line is the inner circumference-scheduled lines of the long hole 39 after finishing). The long hole after the completion of the finishing is a final long hole 39F.

Figure 43:
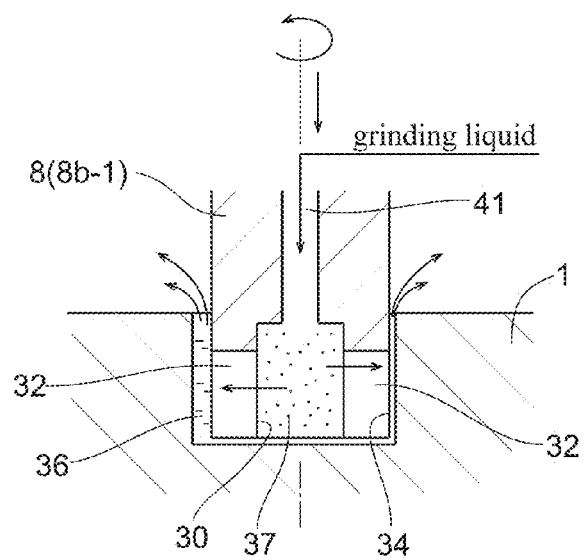
FIG. 43 An explanatory view showing the processing of the tempered glass by using a processing device in accordance with the other embodiment.
Figure 44:
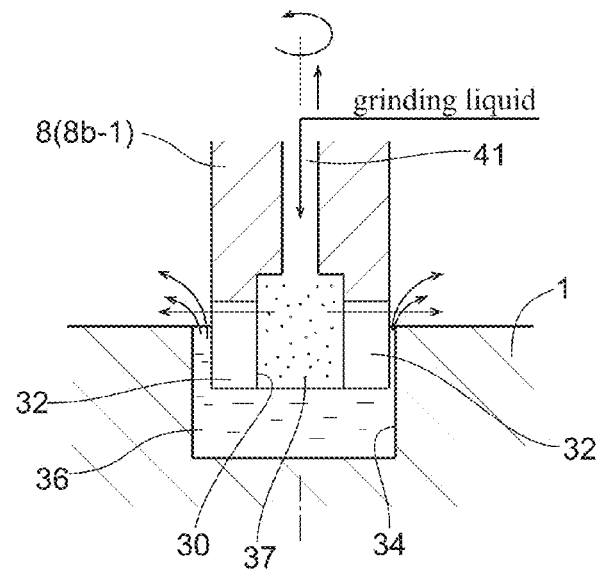
FIG. 44 An explanatory view showing an operation condition change from FIG. 43.

FIGS. 43 and 44 show a further embodiment. In this further embodiment, a path for supplying a grinding liquid 41 is formed in the processing device 8 and is open to the concave portion 30. A grinding liquid is supplied from outside to the path 41, and is guided to the concave portion 30 through the path 41.

The cut scrap 37 in the concave portion 30 of the front end surface 8c of the processing device 8 included by the processing of the tempered glass 1 is continuously pushed out into the hole 34 under the processing through the slits 32 by means of the grinding liquid, and the cut scrap 37 is positively discharged with the grinding liquid from the hole 34 under the processing toward the outside (refer to arrows in FIGS. 43 and 44). Of course, also in this stage, similarly to the above embodiment, the cut scrap 37 in the concave portion 30 is positively discharged through the respective slits 32 to the hole 34 being processed by means of the centrifugal force based on the rotation of the processing device 8 and in addition the cavitation in the grinding liquid generated by the ultrasonic vibration of the processing device 8 in the hole 34 during the processing, and the above discharging function (pumping function) based on the ultrasonic vibration of the processing device 8 in the hole 34 is exerted on the cut scrap 37 discharged to the hole 34. Accordingly, the cut scrap 37 can be effectively discharged from the hole 34 under the processing, and the occurrence of the problem about the processing of the tempered glass 1 due to the remaining of the cut scrap 37 can be suppressed. The formation of the path for supplying the grinding liquid 41 in the processing device 8 can remove a liquid pouring apparatus of supplying the grinding liquid from outside to simplify the structure of supplying the grinding liquid.

While the embodiments of the present invention have been described, the present invention includes the following aspects.

(1) The target amplitude is set to be specified amplitudes in a range between 3 μm and 9 μm, and the target frequency is set to be specified frequencies in a range between 60 kHz and 64 kHz. Thereby, based on the present inventor's finding, the specific amplitude and frequency of the processing device can be provided in view of the processing accuracy of the tempered glass.

In this case, the reason why the target amplitudes are set between 3 μm and 9 μm is that, while the processability is insufficient below 3 μm and the cracks and the chippings above the specified value are generated in the tempered glass (by the increase of a cutting resistance due to the remaining of the cut scrap), the cracks and the chippings above the specified value are generated with higher possibility above 9 μm because the tempered glass cannot follow the stress change in the tempered glass accompanied with the processing. The reason why the target frequencies are set between 60 kHz and 64 kHz is that, while the processability is insufficient below 60 kHz and the cracks and the chippings above the specified value are generated in the tempered glass, the cracks and the chippings above the specified value are generated with higher possibility above 64 kHz because the tempered glass cannot follow the stress change in the tempered glass accompanied with the processing.

(2) The rotating number of the processing device is set to be specified amplitudes in a range between 2000 rpm and 30000 rpm. Thereby, based on the present inventor's finding, the rotation number of the processing device under the above vibration conditions can be preferably set in view of processing the tempered glass having the surface reinforcing layer.

In this case, the reason why the rotation numbers of the processing device are set between 2000 rpm and 30000 rpm is that, while the processing effect of the tempered glass is insufficient below 2000 rpm, the processing effect is reduced above 30000 rpm due to a slip phenomenon (decrease of processing resistance) to the processed surface, and a problem about durability arises.

(3) The tempered glass having the surface reinforced layer includes a stacked glass group prepared by staking a plurality of the tempered glasses.

DESCRIPTION OF SYMBOLS

1 . . . tempered glass
3 . . . surface reinforced glass
4 . . . ultrasonic vibration processing apparatus
7 . . . vibration apparatus (vibration mechanism)
8 . . . processing device
8b-1 . . . diamond electro-deposited section
8c . . . front end surface of the processing device
16 . . . ultrasonic oscillator (vibration adjusting means)
30 . . . concave portion
31 . . . circumferential wall of forming concave portion
32 . . . slit
33 . . . liquid pouring apparatus
35 . . . penetration aperture
35a . . . inner circumference-scheduled line of penetration aperture
38 . . . start hole
38a . . . inner circumference-scheduled lines of start hole
39 . . . long hole
39a . . . inner circumference-scheduled lines of long hole
41 . . . path for supplying grinding liquid
U . . . control unit (control means)

The invention claimed is:

1. A method of processing a chemical tempered glass comprising:
    preparing a processing device of a shaft shape, comprising at least an outer surface of a front end holding diamond grind grains, and a concave portion formed on a central part in a radial direction of a front surface thereof,
    processing the chemical tempered glass by the processing device which is rotated around shaft center thereof and vibrated in a direction of the shaft center,
    controlling vibration of the processing device feeding back an amplitude and a frequency of the vibration to approach a target amplitude and a target frequency, respectively, the target amplitude being in a range from 3 μm to 9 μm and the target frequency being in a range from 60 kHz to 64 kHz; and the feeding back being carried out at every sample frequency of 0.3 msec or less.

2. A method of using a processing device of a chemical tempered glass comprising:
    preparing a processing device of a shaft shape, comprising at least an outer surface of a front end holding diamond grind grains, and a concave portion formed on a central part in a radial direction of a front surface thereof;
    processing the chemical tempered glass by the processing device which is rotated around shaft center thereof and vibrated in a direction of the shaft center;
    controlling vibration of the processing device feeding back an amplitude and a frequency of the vibration to approach a target amplitude and a target frequency, respectively, the target amplitude being in a range from 3 μm to 9 μm and the target frequency being in a range from 60 kHz to 64 kHz; and the feeding back being carried out at every sample frequency of 0.3 msec or less.

* * * * *